(12) United States Patent
Takada et al.

(10) Patent No.: US 8,554,450 B2
(45) Date of Patent: Oct. 8, 2013

(54) CONTROL APPARATUS AND CONTROL METHOD FOR INTERNAL COMBUSTION ENGINE

(75) Inventors: Norifumi Takada, Susono (JP); Tomoaki Honda, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/543,256

(22) Filed: Jul. 6, 2012

(65) Prior Publication Data

US 2013/0018568 A1 Jan. 17, 2013

(30) Foreign Application Priority Data

Jul. 12, 2011 (JP) .................................. 2011-153636

(51) Int. Cl.
*F02D 41/14* (2006.01)
(52) U.S. Cl.
USPC ............ 701/109; 123/672; 123/673; 123/690
(58) Field of Classification Search
USPC .................. 701/103, 109; 123/672, 673, 690
See application file for complete search history.

(56) References Cited

U.S. PATENT DOCUMENTS

| | | | |
|---|---|---|---|
| 6,915,203 B2 * | 7/2005 | Maegawa et al. ............. | 701/114 |
| 7,243,644 B2 | 7/2007 | Okamoto et al. | |
| 7,409,284 B2 | 8/2008 | Okamoto et al. | |
| 7,513,105 B2 * | 4/2009 | Kato .............................. | 60/277 |
| 7,520,274 B2 * | 4/2009 | Sawada et al. ................. | 123/690 |
| 2009/0107113 A1 * | 4/2009 | Thanasiu et al. ............... | 60/276 |
| 2010/0168986 A1 | 7/2010 | Iwazaki et al. | |
| 2012/0006307 A1 | 1/2012 | Demura | |
| 2012/0109497 A1 * | 5/2012 | Anzawa ......................... | 701/103 |
| 2013/0060449 A1 * | 3/2013 | Bagnasco et al. ............. | 701/103 |
| 2013/0073181 A1 * | 3/2013 | Mamada ......................... | 701/103 |

FOREIGN PATENT DOCUMENTS

| | | |
|---|---|---|
| JP | 2005-207354 A | 8/2005 |
| JP | 2009-074388 A | 4/2009 |
| JP | 2009167944 A | 7/2009 |
| JP | 2009209747 A | 9/2009 |
| JP | 2010007561 A | 1/2010 |
| WO | 2010087029 A1 | 8/2010 |
| WO | 2011155073 A1 | 12/2011 |

* cited by examiner

*Primary Examiner* — Erick Solis
(74) *Attorney, Agent, or Firm* — Gifford, Krass, Sprinkle, Anderson & Citkowski, P.C.

(57) ABSTRACT

A control apparatus for an internal combustion engine includes: a first detector that detects air/fuel ratio in an exhaust passageway on an upstream of an exhaust gas-controlling catalyst in multi-cylinder internal combustion engine; a second detector that detects the air/fuel ratio in the exhaust passageway on a downstream of the catalyst; a feedback controller that executes a feedback control so that a first detected value based on the first detector output follows to be equal as a first predetermined target value and so that a second detected value based on the second detector output follows to be equal as a second predetermined target value that corresponds to the first predetermined target value during an initial state; an abnormality detection device configured to detect a variation abnormality in the air/fuel ratio among the cylinders; and a change device that changes the second predetermined target value when the variation abnormality is detected.

7 Claims, 17 Drawing Sheets

US 8,554,450 B2

CONTROL APPARATUS AND CONTROL METHOD FOR INTERNAL COMBUSTION ENGINE

This application claims priority to Japanese Patent Application No. 2011-153636 filed on Jul. 12, 2011, which is incorporated herein by reference in its entirety including the specification, drawings and abstract.

BACKGROUND OF THE INVENTION

1. Field of the Invention

The invention relates to a control apparatus and a control method for an internal combustion engine and, more particularly, to a control apparatus and a control method that are capable of restraining the deterioration of exhaust gases of a multicylinder internal combustion engine when the air/fuel ratio varies among the cylinders of the engine.

2. Description of Related Art

Generally, in an internal combustion engine equipped with an exhaust. gas control system that uses a catalyst, it is essential to control a mixing ratio of air and fuel in a mixture that is burned in the internal combustion engine, that is, the air/fuel ratio, in order to accomplish high-efficient removal of pollutants from exhaust gas through the use of the catalyst. In order to perform such a control of the air/fuel ratio, an air/fuel ratio sensor is provided in an exhaust passageway of the internal combustion engine, and a feedback control is carried out so as to cause the air/fuel ratio detected by the sensor to be equal to a predetermined target air/fuel ratio.

Usually, in a multicylinder internal combustion engine, the air/fuel ratio control is performed by using the same control amount for all the cylinders; therefore, despite the execution of the air/fuel feedback ratio control, the actual air/fuel ratio can vary among the cylinders. In such a case, if the variation of the air/fuel ratio is of a small degree, the variation of the air/fuel ratio can be absorbed by the air/fuel ratio feedback control and pollutants in exhaust gas can be removed by the catalyst. Thus, small degrees of variation of the air/fuel ratio do not affect the exhaust gases, and thus do not lead to any particular problem.

However, if the air/fuel ratio greatly varies among the cylinders due to, for example, failure of the fuel injection systems of one or more cylinders or the valve actuation mechanism of the intake valves, etc., the exhaust gas deteriorates, and problems arise. Such a large variation in the air/fuel ratio as to deteriorate the exhaust gases is detected as an abnormality.

Japanese Patent Application Publication No. 2009-74388 (JP 2009-74388 A) discloses an example of the abnormality detection mentioned above. In an internal combustion engine described in Japanese Patent Application Publication No. 2009-74388 (JP 2009-74388 A), a main air/fuel ratio feedback control in which the air/fuel ratio detected by using a pre-catalyst sensor that is provided in an exhaust passageway on an upstream side of a three-way catalyst is caused to be equal to a stoichiometric ratio, and an auxiliary air/fuel ratio feedback control in which the air/fuel ratio detected by using a post-catalyst sensor provided at the downstream side of the three-way catalyst is caused to be equal to the stoichiometric ratio are executed. Furthermore, as a result of comparison between two cases in which the amount of deviation of the total air/fuel ratio is the same, it has been shown that the amount of hydrogen in exhaust gas discharged into an exhaust passageway tends to be larger when the air/fuel ratio of a cylinder alone is greatly deviated to the rich side than when the air/fuel ratios of all the cylinders are small, and are equally deviated to the rich side. Since such hydrogen is able to be removed by the three-way catalyst, there occurs a difference between the air/fuel ratio detected by the pre-catalyst sensor and the air/fuel ratio detected by the post-catalyst sensor when there is abnormality of air/fuel ratio variation among the cylinders. On the basis of this relation, the variation abnormality in the air/fuel ratio among the cylinders is detected in the internal combustion engine of the foregoing JP 2009-74388 A.

In order to appropriately perform the removal of pollutants in exhaust gas through the use of the catalyst as described above, it is permissible to execute such a feedback control that the exhaust air/fuel ratio is caused to be equal to a predetermined target air/fuel ratio. However, when the variation abnormality in the air/fuel ratio among the cylinders is present, it is not easy to appropriately control the air/fuel ratio by the aforementioned air/fuel ratio feedback control.

SUMMARY OF THE INVENTION

The invention relates to a control apparatus and a control method for an internal combustion engine which more appropriately control the exhaust air/fuel ratio than in the related art when the variation abnormality in the air/fuel ratio among the cylinders is present.

A first aspect of the invention relates to a control apparatus for an internal combustion engine that includes: a first air/fuel ratio detection device that detects air/fuel ratio in an exhaust passageway on an upstream side of an exhaust gas-controlling catalyst in an internal combustion engine that has a plurality of cylinders; a second air/fuel ratio detection device that detects the air/fuel ratio in the exhaust passageway on a downstream side of the exhaust gas-controlling catalyst; an air/fuel ratio feedback control device that executes an air/fuel ratio feedback control so that a first detected value based on output of the first air/fuel ratio detection device follows to be equal as a first predetermined target value and so that a second detected value based on output of the second air/fuel ratio detection device follows to be equal as a second predetermined target value that corresponds to the first predetermined target value during an initial state; an abnormality detection device configured to detect a variation abnormality in the air/fuel ratio among the cylinders; and a change device that changes the second predetermined target value of the air/fuel ratio feedback control when the variation abnormality in the air/fuel ratio among the cylinders is detected by the abnormality detection device.

In the foregoing aspect, the abnormality detection device may be configured to find degree of variation in air/fuel ratio among the cylinders as well as detect the variation abnormality in the air/fuel ratio among the cylinders, and the change device may change the second predetermined target value according to the degree found by the abnormality detection device.

In the foregoing aspect, the abnormality detection device may be configured to detect an amount of a fuel injection of a cylinder that has an fuel injection amount deviation is deviated from the fuel injection amount of a cylinder that does not have the fuel injection amount deviation on assumption that only one of the plurality of cylinders has the fuel injection amount deviation, if the variation abnormality is present, as well as detect the variation abnormality in the air/fuel ratio among the cylinders, and the change device may change the second predetermined target value according to the deviation found by the abnormality detection device.

In the foregoing aspect, the abnormality detection device is configured to determine which one of the cylinders is the cylinder that has the fuel injection amount deviation on assumption that only one of the cylinders has the fuel injection amount deviation, if the variation abnormality is present, as well as detect the variation abnormality in the air/fuel ratio among the cylinders, derive the degree, and derive the deviation, and the change device may change the second predetermined target value according to a value found by the abnormality detection device and the cylinder determined by the abnormality detection device.

In the foregoing aspect, the change device may increase an amount of the change of the second predetermined target value with increase in influence of exhaust gas from the cylinder determined as having the fuel injection amount deviation by the abnormality detection device on the second detected value of the second air/fuel ratio detection device.

In the foregoing aspect, the change device may change the second predetermined target value based on at least one of rotation speed of the engine and load of the engine.

In the foregoing aspect, the first air/fuel ratio detection device may include a wide-range air/fuel ratio sensor, and the second air/fuel ratio detection device may include an $O_2$ sensor.

A second aspect of the invention relates to an internal combustion engine control method that includes: detecting a first air/fuel ratio in an exhaust passageway on an upstream side of an exhaust gas-controlling catalyst in an internal combustion engine that has a plurality of cylinders, detecting a second air/fuel ratio in the exhaust passageway on a downstream side of the exhaust gas-controlling catalyst; executing an air/fuel ratio feedback control so that the first air/fuel ratio follows to be equal as a first predetermined target value and so that the second air/fuel ratio follows to be equal as a second predetermined target value that corresponds to the first predetermined target value during an initial state; and changing the second predetermined target value of the air/fuel ratio feedback control when the variation abnormality in the air/fuel ratio among the cylinders is detected.

According to the foregoing aspects, there can be achieved an excellent effect of being able to more appropriately control the air/fuel ratio than in the related art when the variation abnormality in the air/fuel ratio among the cylinders is detected.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments of the invention will be described hereinafter with reference to the accompanying drawings. Firstly, a first embodiment of the invention will be described.

Figure 1:
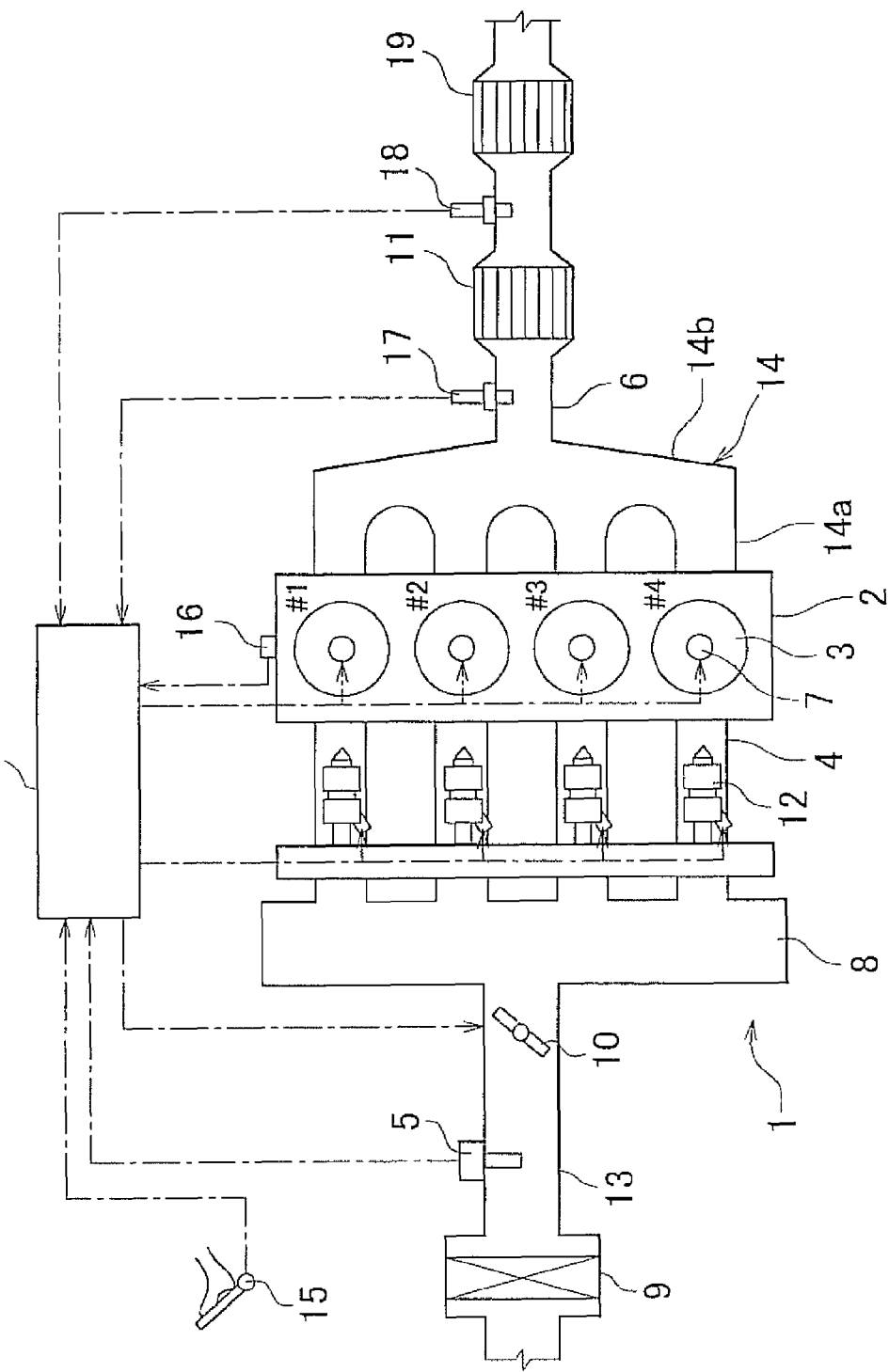
FIG. 1 is a general diagram of an internal combustion engine in accordance with a first embodiment of the invention.

FIG. 1 is a general diagram of an internal combustion engine in accordance with an embodiment of the invention. The internal combustion engine (engine) 1 produces power by burning a mixture of fuel and air in combustion chambers 3 that are formed in a cylinder block 2 so as to reciprocate a piston in each combustion chamber 3. The engine 1 in this embodiment is an internal combustion engine having a plurality of cylinders, that is, a multicylinder internal combustion engine, which is mounted in a motor vehicle, and, more concretely, is an in-line four-cylinder spark ignition type internal combustion engine. The engine 1 has #1 to #4 cylinders. However, the number of cylinders, the use of the engine, the type thereof, etc., are not particularly limited.

A cylinder head of the engine 1 is provided with intake valves that open and close intake ports and exhaust valves that open and close exhaust ports. The intake valves and the exhaust valves are disposed individually for the cylinders, and are opened and closed via camshafts (not shown). In a top portion of the cylinder head, ignition plugs 7 for igniting mixture in the combustion chambers 3 are attached separately for each cylinder.

The intake ports of the cylinders are connected to a surge tank 8 that is an intake collective chamber, via branch pipes 4 of the individual cylinders. An intake pipe 13 is connected to an upstream side of the surge tank 8. An upstream end of the intake pipe 13 is provided with an air cleaner 9. An air flow meter 5 for detecting the amount of intake air, and an electronically controlled throttle valve 10 are incorporated in the intake pipe 13 in that order from the upstream side. The intake ports, the branch pipes 4, the surge tank 8 and the intake pipe 13 each define and form a portion of an intake passageway.

Injectors (fuel injection valves) 12 that inject fuel into the intake passageway, and particularly, into the intake ports, are provided separately for each cylinder. The fuel injected from each injector 12 is mixed with intake air to form a mixture that is taken into a corresponding one of the combustion chambers 3 when the intake valve is opened. Then, the mixture is compressed by the piston, and is ignited to burn by the ignition plug 7.

On the other hand, the exhaust ports of the cylinders are connected to an exhaust manifold 14. The exhaust manifold 14 is made up of branch pipes 14a that are provided separately for the cylinders and that form an upstream portion of the exhaust manifold 14, and an exhaust collective portion 14b that forms a downstream portion of the exhaust manifold 14. An exhaust pipe 6 is connected to a downstream side of the exhaust collective portion 14b. The exhaust ports, the exhaust manifold 14 and the exhaust pipe 6 each define and form a portion of an exhaust passageway.

In an upstream-side portion and a downstream-side portion of the exhaust pipe 6, there are provided an upstream catalytic converter 11 and a downstream catalytic converter 19, respectively, in series. Each of the catalytic converters 11 and 19 has an exhaust gas-controlling catalyst that is made up of a three-way catalyst. These catalytic converters 11 and 19 have oxygen storage capability ($O_2$ storage capability). Specifically, each of the catalytic converters 11 and 19 stores excess oxygen in exhaust gas and therefore reduces NOx when the air/fuel ratio of exhaust gas is greater (leaner) than a stoichiometric ratio (e.g., A/F=14.6). When the air/fuel ratio of exhaust gas is smaller (richer) than the stoichiometric ratio, each of the catalytic converters 11 and 19 releases stored oxygen, and therefore oxidizes HC and CO.

In portions of the exhaust passage on the upstream and downstream sides of the upstream catalytic converter 11, that is, the catalyst provided in the converter, there are disposed first and second air/fuel ratio sensors for detecting the air/fuel ratios of exhaust gas, that is, a pre-catalyst sensor 17 and a post-catalyst sensor 18. The pre-catalyst sensor 17 and the post-catalyst sensor 18 are disposed at positions immediately forward and immediately rearward of the upstream catalytic converter 11, and make it possible to detect the air/fuel ratio on the basis of the oxygen concentration in exhaust gas. Thus, one catalytic converter-sensor 17 is disposed in an exhaust collective portion at the upstream side of the upstream catalytic converter 11.

The ignition plugs 7, the throttle valve 10, the injectors 12, etc. that are mentioned above are electrically connected to an electronic control unit (hereinafter, termed the ECU) 20 that is control means or a control device. The ECU 20 includes a CPU, a storage device that includes a ROM and a RAM, an input/output port, etc. (none of which is shown). Furthermore, as shown in FIG. 1, the ECU 20 is electrically connected to the air flow meter 5, the pre-catalyst sensor 17, the post-catalyst sensor 18, and also to a crank angle sensor 16 that detects the crank angle of the engine 1, an accelerator operation amount sensor 15 that detects the accelerator operation amount, and other various sensors, via A/D converters (not shown) and the like. The ECU 20 controls the ignition plugs 7, the throttle valve 10, the injectors 12, etc. and thereby controls the ignition timing, the fuel injection amount, the fuel injection timing, the throttle opening degree, etc., on the basis of detected values from the various sensors, and the like, so as to achieve a desired output. Thus, the ECU 20 substantially performs the functions of ignition control means, fuel injection control means, intake air amount control means, and air/fuel ratio control means. The air/fuel ratio control means will be described further in detail below as air/fuel ratio feedback control means, The throttle valve 10 is provided with a throttle opening degree sensor (not shown), and a signal from the throttle opening degree sensor is sent to the ECU 20. The ECU 20 usually performs a feedback control of controlling the degree of opening of the throttle valve 10 (throttle opening degree) to a target throttle opening degree that is determined according to the accelerator operation amount.

The ECU 20 detects the amount of intake air, that is, the intake air amount, per unit time, on the basis of a signal from the air flow meter 5. Then, the ECU 20 detects the load of the engine 1 on the basis of at least one of the detected accelerator operation amount, the detected throttle opening degree and the detected intake air amount.

The ECU 20, on the basis of a crank pulse signal from the crank angle sensor 16, detects the crank angle, and also detects the number of revolutions of the engine 1. Herein, the "number of revolutions" refers to the number of revolutions per unit time, and means the same as the rotation speed. In this embodiment, the number of revolutions refers to the number of revolutions per minute (rpm).

Figure 2:
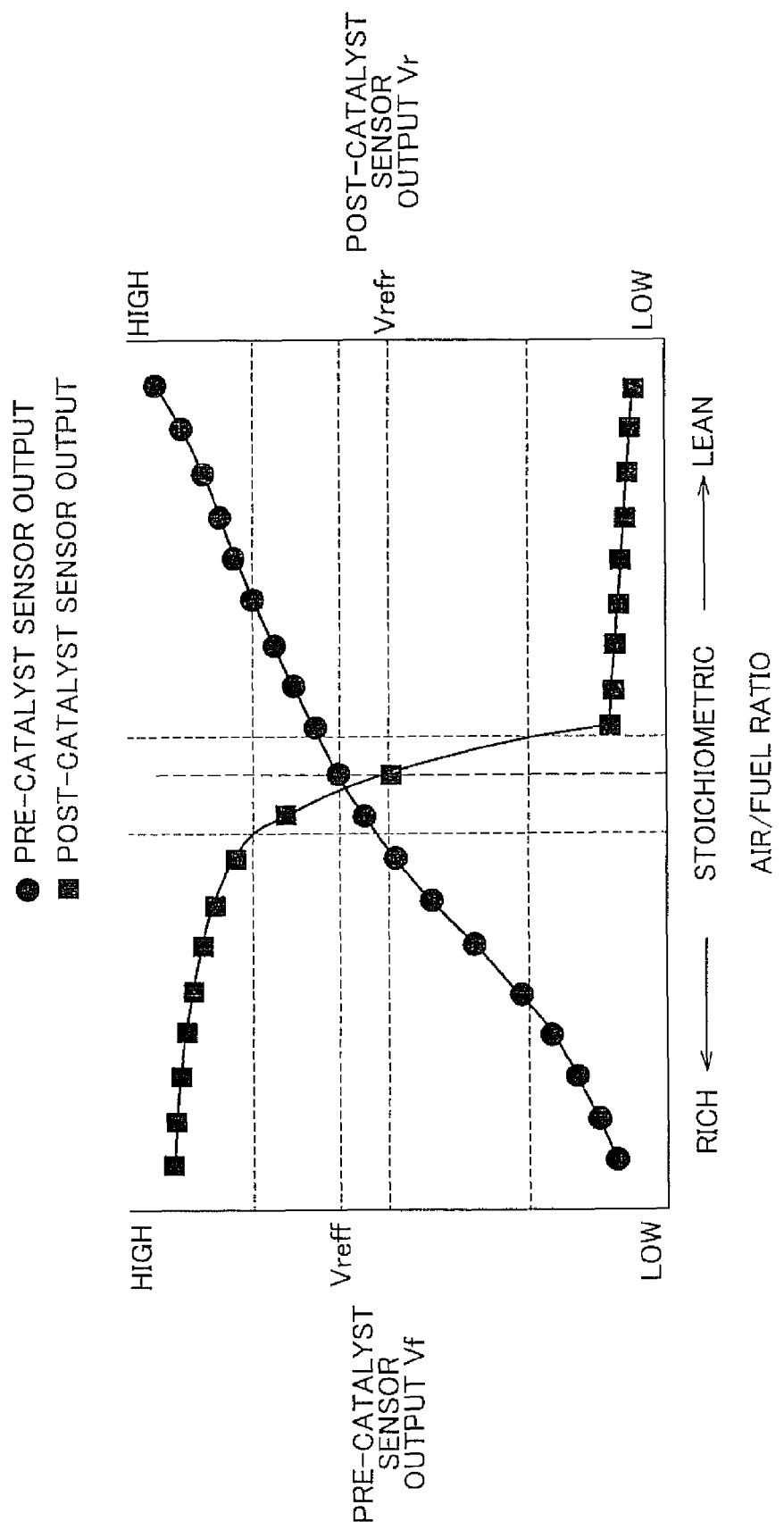
FIG. 2 is a graph showing output characteristics of a pre-catalyst sensor and a post-catalyst sensor.

The pre-catalyst sensor 17 provided as first air/fuel ratio detection means is made up of a so-called wide-range air/fuel ratio sensor, and is capable of continuously detecting the air/fuel ratio over a relatively wide range. FIG. 2 shows an output characteristic of the pre-catalyst sensor 17. As shown in FIG. 2, the pre-catalyst sensor 17 outputs a voltage signal Vf whose magnitude is proportional to the exhaust air/fuel ratio. The output voltage that the pre-catalyst sensor 17 produces when the exhaust air/fuel ratio is stoichiometric is Vreff (e.g., about 3.3 V).

On the other hand, the post-catalyst sensor 18 as second air/fuel ratio detection means is formed by a so-called $O_2$ sensor, and has a characteristic in which the output value of the sensor changes sharply in the vicinity of the stoichiometric ratio. That is, the post-catalyst sensor 18 has an output characteristic in which the output fluctuations in conjunction with changes in the air/fuel ratio in a predetermined air/fuel ratio region are great in comparison with the output characteristic of the pre-catalyst sensor 17. FIG. 2 shows the output characteristic of the post-catalyst sensor 18. As shown in FIG. 2, the output voltage that the sensor 18 produces when the exhaust air/fuel ratio is stoichiometric, that is, a stoichiometric ratio-corresponding voltage value, is Vrefr (e.g., 0.45 V). The output voltage of the post-catalyst sensor 18 changes within a predetermined range (e.g., of 0 to 1 V). When the exhaust air/fuel ratio is leaner than the stoichiometric ratio, the output voltage of the post-catalyst sensor is lower than the stoichiometric ratio-corresponding voltage value Vrefr, and when the exhaust air/fuel ratio is richer than the stoichiometric ratio, the output voltage of the post-catalyst sensor is higher than the stoichiometric ratio-corresponding value Vrefr.

Each of the upstream catalytic converter 11 and the downstream catalytic converter 19 is capable of simultaneously removing NOx, HC and CO, which are pollutants in exhaust gas, when the air/fuel ratio A/F of the exhaust gas that flows into the catalytic converter is in the vicinity of the stoichiometric ratio. The width (window) of the air/fuel ratio in which the three pollutants can be simultaneously removed with high efficiency is relatively narrow.

Therefore, during usual operation of the engine 1, a portion of the ECU 20 that performs the function of the air/fuel ratio feedback control executes an air/fuel ratio feedback control (stoichiometric control) so that the air/fuel ratio of the exhaust gas that flows into the upstream catalytic converter 11 is controlled to the vicinity of the stoichiometric ratio. The air/fuel ratio feedback control includes a main air/fuel ratio feedback control in which the exhaust air/fuel ratio detected by using the pre-catalyst sensor 17 is caused to be equal to the stoichiometric ratio, which is a predetermined target air/fuel ratio, and an auxiliary air/fuel ratio feedback control in which the exhaust air/fuel ratio detected by using the post-catalyst sensor 18 is caused to be equal to the stoichiometric ratio. Concretely, in the main air/fuel ratio feedback control, in order to cause the present exhaust air/fuel ratio detected on the basis of the output of the pre-catalyst sensor 17 to be substantially equal to a predetermined target air/fuel ratio, a control is executed in which a first correction factor is computed and then the amount of fuel injection from the injectors 12 is adjusted on the basis of the first correction factor. In the auxiliary air/fuel ratio feedback control, a control is executed in which a second correction factor is computed on the basis of the output of the post-catalyst sensor 18, and the first correction factor obtained in the main air/fuel ratio feedback control is adjusted by using the second correction factor.

Figure 3:
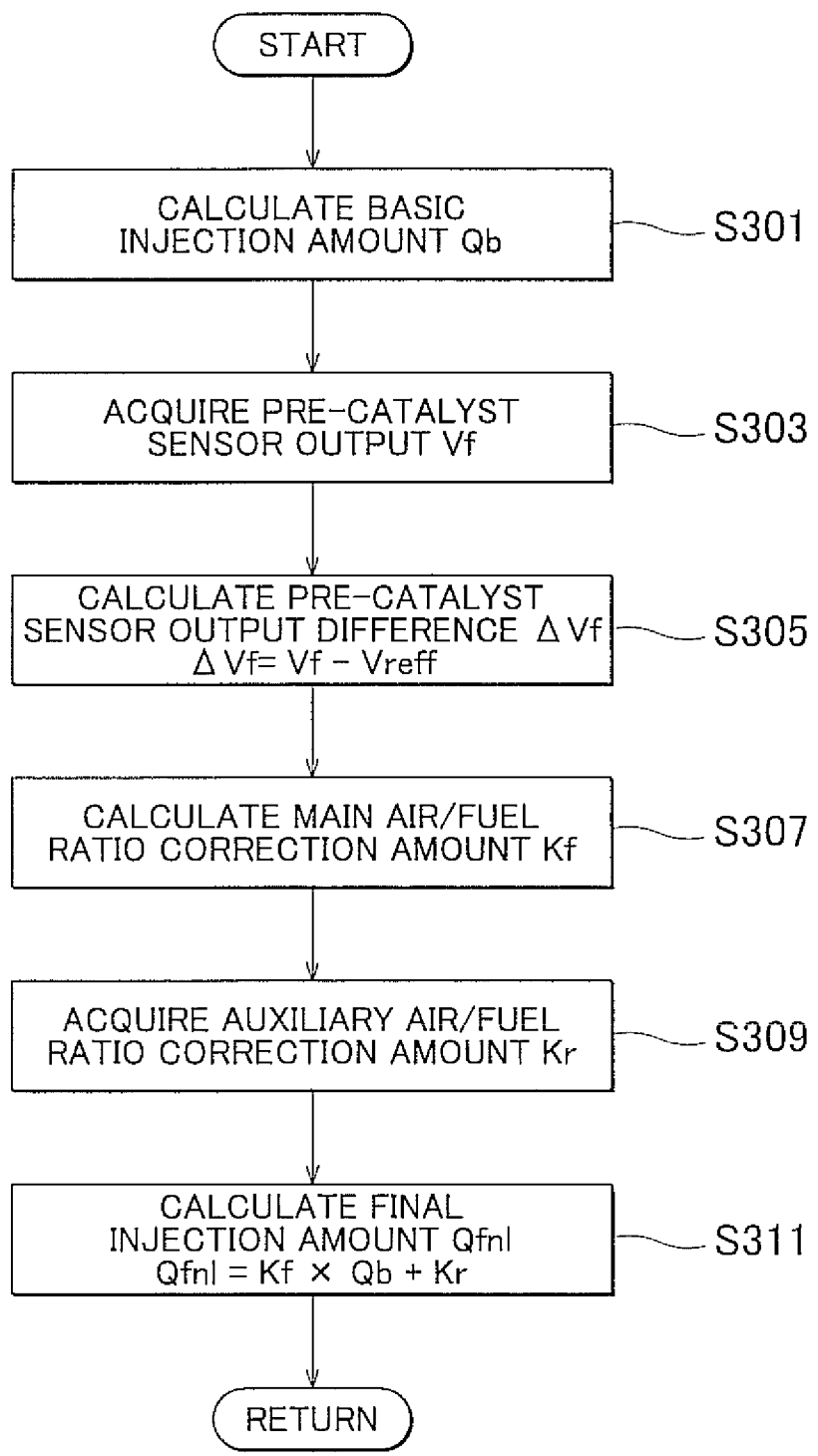
FIG. 3 is a flowchart showing a main routine of an air/fuel ratio control.

The stoichiometric control as mentioned above will be further described. FIG. 3 shows a main routine of the stoichiometric control. Execution of this main routine is repeated by the ECU 20 at every engine cycle (=720° CA).

Firstly, in step S301, such a basic, amount of fuel injection as to bring about the stoichiometric air/fuel ratio of the in-cylinder mixture, that is, a basic injection amount Qb, is calculated. The basic injection amount Qb is, for example, calculated on the basis of the intake air amount Ga detected by the air flow meter, as shown in expression 1.

$$Qb=Ga/14.6 \quad \text{Expression 1}$$

In step S303, the output Vf of the pre-catalyst sensor 17 is acquired. The output Vf of the pre-catalyst sensor 17 acquired in this step can be considered to correspond to a first detected value that is based on the output of the pre-catalyst sensor 17.

In step S305, a difference between this sensor output Vf and a stoichiometric ratio-corresponding sensor output Vreff (see FIG. 2), that is, a pre-catalyst sensor output difference ($\Delta$Vf=Vf−Vreff), is calculated. The stoichiometric ratio-corresponding sensor output Vreff will be sometimes called as a first predetermined target value in the following description, and can be considered to correspond to a first predetermined target value in the invention.

Figure 4:
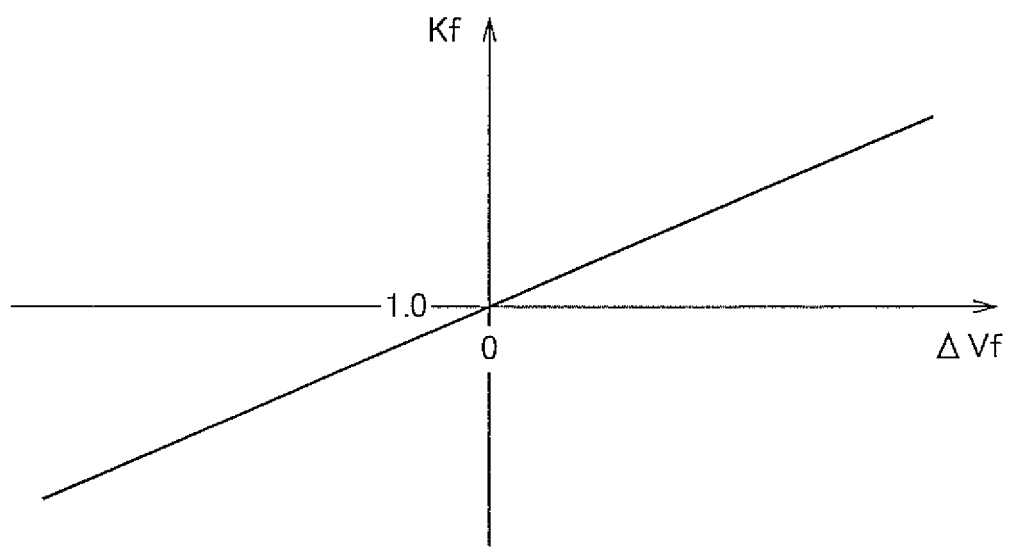
FIG. 4 is a calculation map for main air/fuel ratio correction amount.

In step S307, a main air/fuel ratio correction amount (correction factor) Kf is calculated from a map as shown in FIG. 4 (that may be replaced by a function, which hereinafter applies in the same manner) on the basis of the pre-catalyst sensor output difference $\Delta$Vf. The pre-catalyst sensor output difference $\Delta$Vf and the main air/fuel ratio correction amount Kf serve as control amounts for the main air/fuel ratio feedback control. For example, if the gain is represented by Pf, the main air/fuel ratio correction amount Kf is expressed as Kf=Pf×$\Delta$Vf.

Then, in step S309, a value of the auxiliary air/fuel ratio correction amount Kr set in a subroutine shown in FIG. 5 as described later is acquired. Finally, in step S311, a final amount of fuel injection that needs to be injected from the injectors 12, that is, a final injection amount Qfnl, is calculated by expression 2.

$$Qfnl=Kf \times Qb+Kr \quad \text{Expression 2}$$

According to the map shown in FIG. 4, as the pre-catalyst sensor output Vf is larger while being larger than the stoichiometric ratio-corresponding sensor output Vreff ($\Delta$Vf>0), that is, as the actual pre-catalyst air/fuel ratio is farther away from the stoichiometric ratio toward the lean side, the magnitude of the obtained correction amount Kf relative to 1 is larger and therefore the basic injection amount Qb is more increased for correction. Conversely, as the pre-catalyst sensor output Vf is smaller while being smaller than the stoichiometric ratio-corresponding sensor output Vreff ($\Delta$Vf<0), that is, as the actual pre-catalyst air/fuel ratio is farther away from the stoichiometric ratio toward the rich side, the magnitude of the obtained correction amount Kf relative to 1 is smaller and therefore the basic injection amount Qb is more decreased for correction. In this manner, the main air/fuel ratio feedback control in which the air/fuel ratio detected by the pre-catalyst sensor 17 is made equal to the stoichiometric ratio is executed.

The value of the final injection amount Qfnl obtained in step S311 is used uniformly for all the cylinders that are objects of the control. That is, during one engine cycle, an amount of fuel equal to the final injection amount Qfnl is sequentially injected from the injectors 12 of the cylinders, and during the next engine cycle, an amount of fuel equal to the newly calculated final injection amount Qfnl is sequentially injected from the injectors 12 of the cylinders.

In the calculation of the final injection amount Qfnl, other corrections (a coolant temperature correction, a battery voltage correction, etc.) can be added, as well known.

Figure 5:
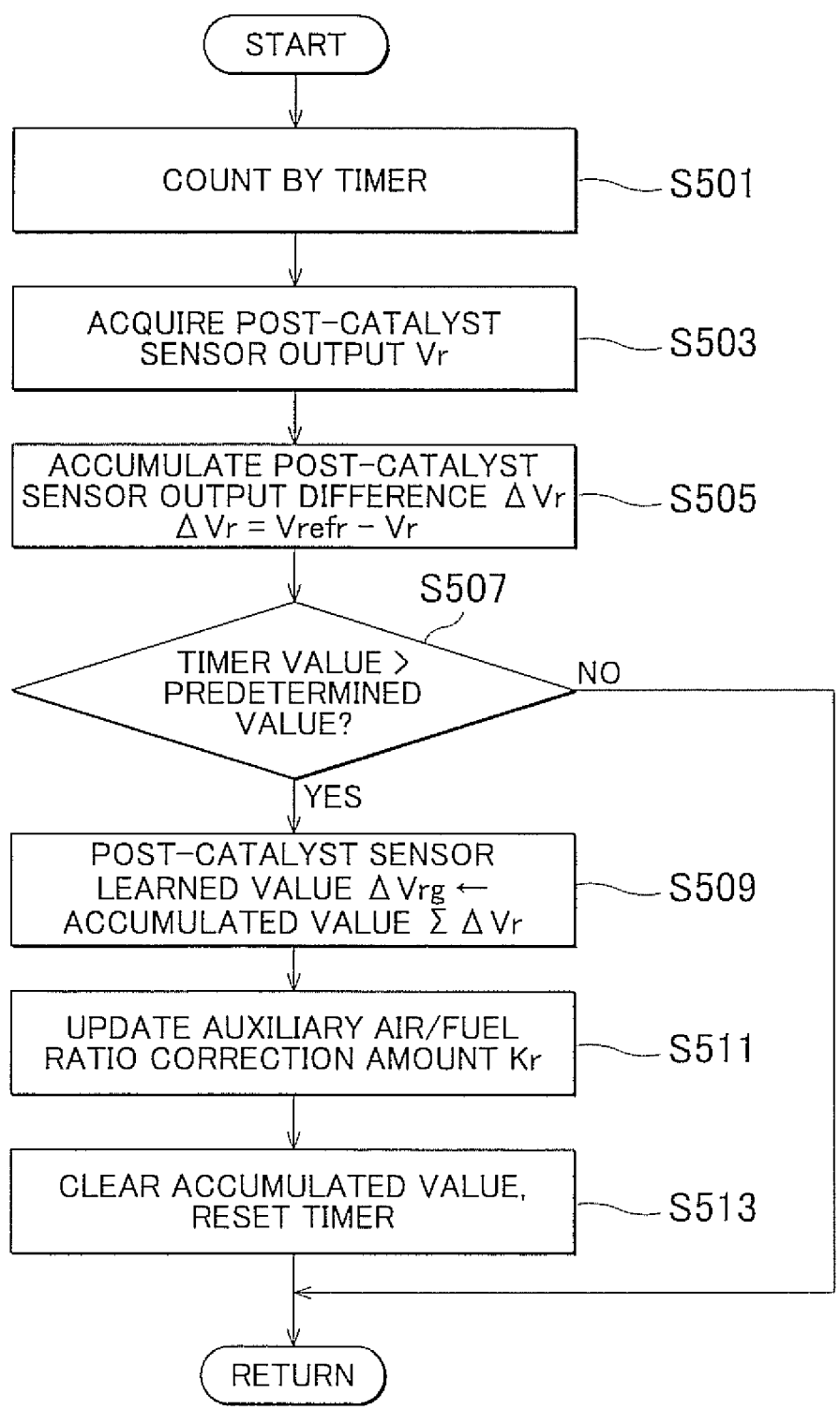
FIG. 5 is a flowchart showing a subsidiary routine for setting an auxiliary air/fuel ratio correction amount.

FIG. 5 shows a subroutine for setting an auxiliary air/fuel ratio correction amount. Execution of this subroutine is repeated by the ECU 20 at every predetermined computation period.

Firstly in step S501, the counting by a timer installed in the ECU 20 is executed. Then, in step S503, the output Vr of the post-catalyst sensor 18 is acquired. The output Vr of the post-catalyst sensor 18 acquired in this step can be considered to correspond to a second detected value based on the output of the post-catalyst sensor 18.

Figure 6:
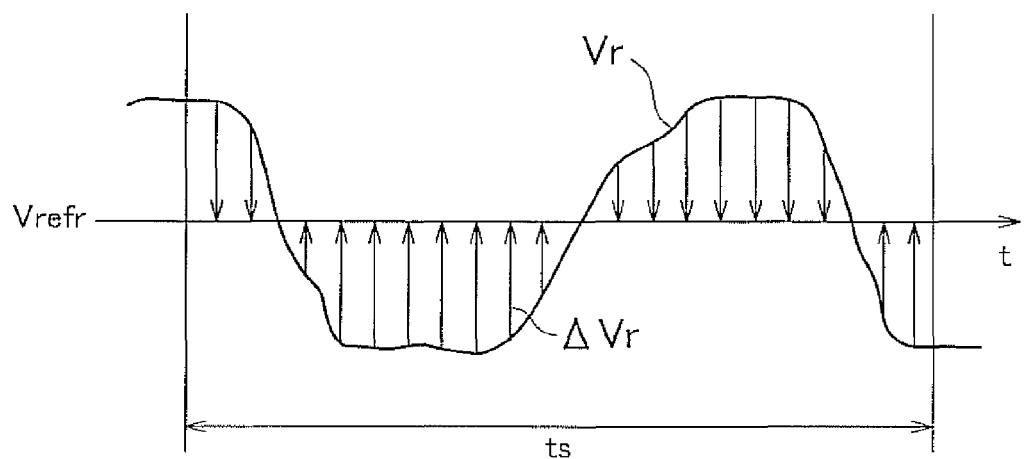
FIG. 6 is a time chart showing output differences of the post-catalyst sensor and the manner of accumulating the output differences.

In step S505, a difference between this sensor output Vr and the stoichiometric ratio-corresponding sensor output Vrefr (see FIG. 2), that is, a post-catalyst sensor output difference ($\Delta$Vr=Vrefr−Vr), is calculated, and the post-catalyst sensor output difference $\Delta$Vr added to the previous accumulated value. FIG. 6 shows such post-catalyst sensor output differences $\Delta$Vr and how the output differences are accumulated. The stoichiometric ratio-corresponding sensor output Vrefr is sometimes called as a second predetermined target value in the following description, and can be considered to correspond to a second predetermined target value in the invention.

Then, in step S507, it is determined whether the timer value has exceeded a predetermined value ts. If the timer value has not exceeded the predetermined value ts, the routine is temporarily ended.

Figure 7:
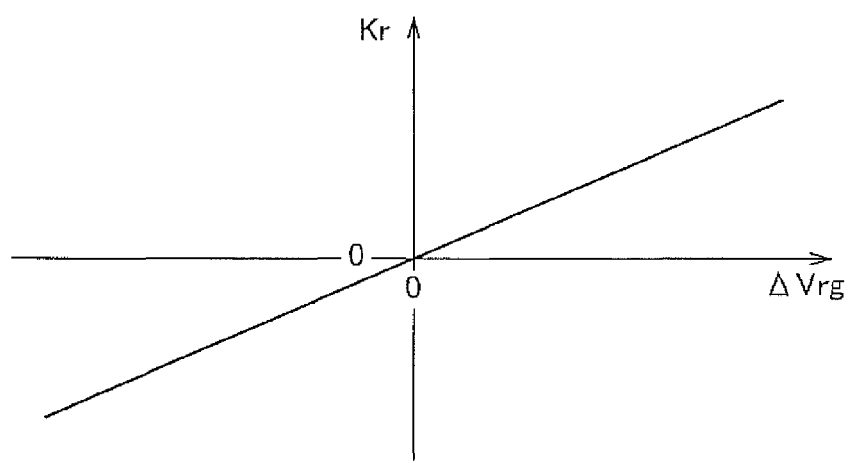
FIG. 7 is a calculation map for the auxiliary air/fuel ratio correction amount.

If in step S507 it is determined that the timer value has exceeded the predetermined value ts, the process proceeds to step S509, in which an accumulated post-catalyst sensor output difference value $\Sigma\Delta$Vr at this time point is stored as an update, that is, learned, as a learned post-catalyst sensor value $\Delta$Vrg. Then, in step S511, an auxiliary air/fuel ratio correction amount Kr is calculated from a map as shown in FIG. 7, on the basis of the learned post-catalyst sensor value $\Delta$Vrg, and the auxiliary air/fuel ratio correction amount Kr is stored as an update, that is, is learned. The learned post-catalyst sensor value $\Delta$Vrg and the auxiliary air/fuel ratio correction amount Kr serve as control amounts for the auxiliary air/fuel ratio feedback control. For example, if the gain is represented by Pr, the auxiliary air/fuel ratio correction amount Kr is expressed by Kr=Pr×ΔVrg. Finally, in step S513, the accumulated post-catalyst sensor output difference value ΣΔVr is cleared and the tinier is reset.

A reason for accumulating the post-catalyst sensor output differences ΔVr for the predetermined time ts is to detect the amount of deviation in a time-averaged fashion of the post-catalyst sensor output Vr from the stoichiometric ratio-corresponding sensor output Vrefr. The predetermined value ts that provides the accumulation time is much longer than one engine cycle, and therefore the updating of the learned post-catalyst sensor value ΔVrg and the auxiliary air/fuel ratio correction amount Kr is performed at periodic intervals that are longer than the engine cycle.

According to the map shown in FIG. 7, as the post-catalyst sensor output Vr, while being smaller than the stoichiometric ratio-corresponding sensor output Vrefr (ΔVrg>0), is smaller in a time-averaged fashion, that is, as the actual post-catalyst air/fuel ratio is farther away from the stoichiometric ratio toward the lean side, the magnitude of the obtained correction amount Kr relative to 0 is larger, and the basic injection amount Qb is more increased for correction at the time of calculation of the final injection amount. Conversely, as the post-catalyst sensor output Vr, while being larger than the stoichiometric ratio-corresponding sensor output Vrefr (ΔVrg<0), is larger in a time-averaged fashion, that is, as the actual post-catalyst air/fuel ratio is farther away from the stoichiometric ratio toward the rich side, the magnitude of the obtained correction amount Kr relative to 0 is smaller, and the basic injection amount Qb is more decreased for correction at the time of calculation of the final injection amount. In this manner, such an auxiliary air/fuel ratio feedback control as to cause the post-catalyst air/fuel ratio detected by using the post-catalyst sensor 18 to become equal to the stoichiometric ratio is executed.

Execution of the main air/fuel ratio feedback control can result in an air/fuel ratio deviated from the stoichiometric ratio due to individual variations among engines and vehicles, the degradation of the pre-catalyst sensor 17, etc. For the purpose of correcting this deviation, the auxiliary air/fuel ratio feedback control is executed in an auxiliary fashion.

Although in this example, the learned post-catalyst sensor value ΔVrg and the correction amount Kr are updated every time new values thereof are calculated, the updating rate may be lowered by performing an averaging process such as smoothing or the like.

As described above, the portion of the ECU 20 which performs the function of the air/fuel ratio feedback control means executes the air/fuel ratio feedback control so that the detected value (first detected value) based on the output of the pre-catalyst sensor 17 follows to be equal as the first predetermined target value and so that, in an auxiliary fashion, the detected value (second detected value) based on the output of the post-catalyst sensor 18 follows to be equal as the second predetermined target value that corresponds to (or is equivalent to) the first predetermined target value. The detected value based on the output of the pre-catalyst sensor 17 may be the output of the sensor itself or a value converted from the output. Likewise, the detected value based on the output of the post-catalyst sensor 18 may be the output of the sensor itself or a value converted from the output.

For example, in some cases, there occurs an event in which at least one of the cylinders (in particular, one cylinder) has an abnormality of any kind, and therefore variation in the air/fuel ratio (imbalance) among the cylinders occurs. An example of the event is a case where, for example, the fuel injection amount of the #1 cylinder becomes relatively large due to failure of the #1 cylinder, and therefore the air/fuel ratio of the #1 cylinder deviates greatly to the rich side of the air/fuel ratio of the #2, #3 and #4 cylinders. Even in this case, the air/fuel ratio of a total gas supplied to the pre-catalyst sensor 17 can sometimes be controlled to the stoichiometric ratio if a relatively large correction amount is given by the aforementioned air/fuel ratio feedback control. However, this is a state in which, in view of the individual cylinders, the air/fuel ratio of the #1 cylinder is greatly richer than the stoichiometric ratio, and the air/fuel ratio of each of the #2, #3 and #4 cylinders is slightly leaner than the stoichiometric ratio, and the stoichiometric ratio is obtained merely as an overall balance. Thus, emissions deteriorate. Therefore, in this embodiment, there is provided a measure that prevents degradation of exhaust gases even in the case where such a variation in the air/fuel ratio among the cylinders occurs.

Firstly, detection of the variation abnormality in the air/fuel ratio among the cylinders will be described. The detection of the variation abnormality in the air/fuel ratio among the cylinders is substantially executed by a portion of the ECU 20 that performs the function of the abnormality detection means that is configured to detect the abnormality.

Figure 8:
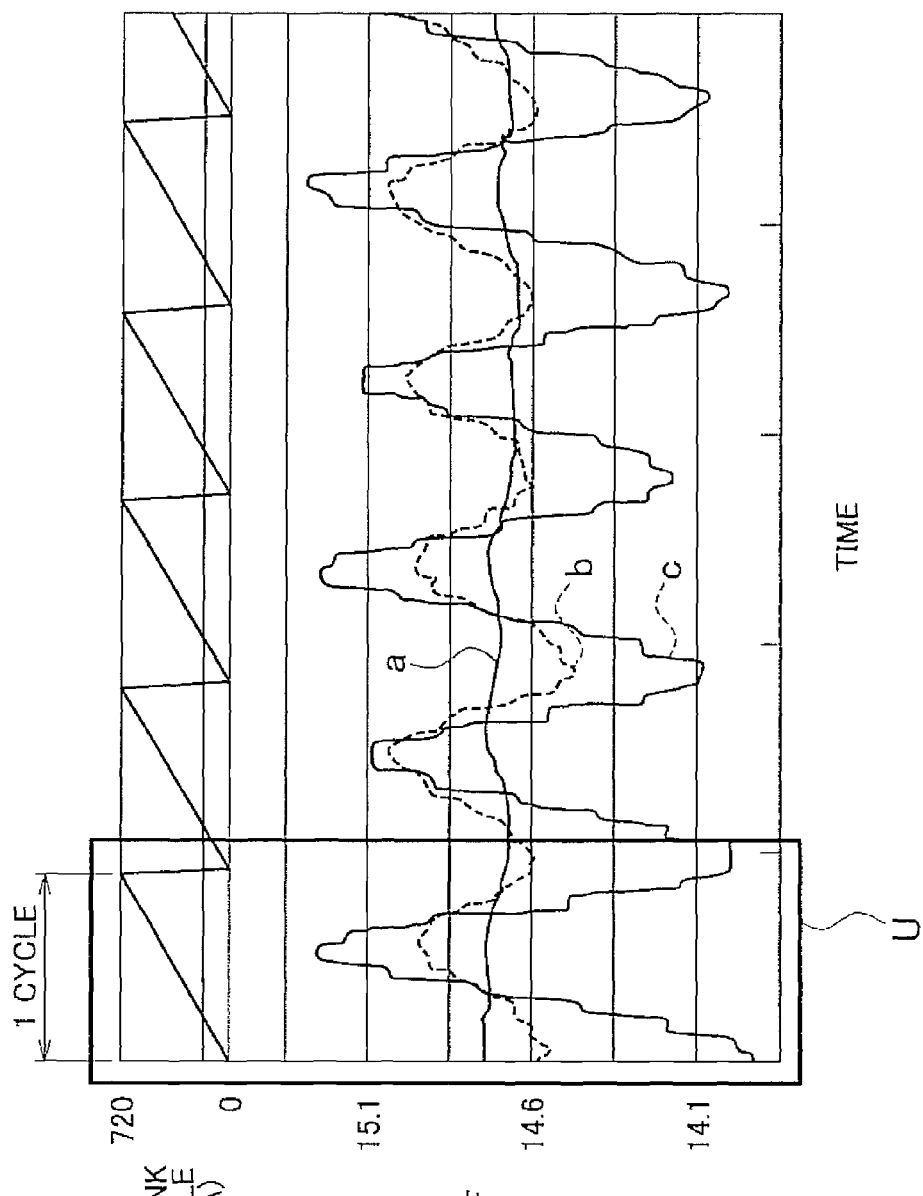
FIGS. 8A and 8B are graphs showing fluctuations of the exhaust air/fuel ratio commensurate with the degree of variation in the air/fuel ratio among the cylinders.

As shown in FIGS. 8A and 8B, if a variation in the air/fuel ratio among the cylinders occurs, the fluctuation of the exhaust air/fuel ratio in one engine cycle (=720° CA) becomes large. In FIG. 8B, air/fuel ratio graphs a, b and c show the air/fuel ratios A/F detected by the pre-catalyst sensor 17 when there is no such variation in the air/fuel ratio among the cylinders, when one cylinder alone has a rich deviation of 20% in imbalance rate, and when one cylinder alone has a rich deviation of 50% in imbalance rate, respectively. As can be seen in FIG. 8B, the greater the degree of variation in the air/fuel ratio among the cylinders, the greater the amplitude of the air/fuel ratio fluctuation.

It is to be noted herein that the imbalance rate (%) is a parameter that represents the degree of variation in air/fuel ratio among the cylinders. That is, the imbalance rate shows, in the case where only a certain one of all the cylinders has a deviation in the fuel injection amount, by what percentage the fuel injection amount of the cylinder having a fuel injection amount deviation (imbalance cylinder) is deviated from the fuel injection amount of each of the cylinders that do not have any fuel injection amount deviation (balance cylinders), that is, a reference fuel injection amount. The imbalance rate IB is expressed by IB=(Qib−Qs)/Qs×100 where Qib is the fuel injection amount of the imbalance cylinder and Qs is the fuel injection amount of the balance cylinders (i.e., the reference fuel injection amount). As the imbalance rate IB is greater, the fuel injection amount deviation of the imbalance cylinder relative to the balance cylinders is greater and the degree of variation in the air/fuel ratio is greater.

As can be understood from FIGS. 8A and 8B, as the imbalance rate is greater, that is, as the degree of variation in air/fuel ratio among the cylinders is greater, the fluctuation of the output of the pre-catalyst sensor 17 is greater.

Hence, in this embodiment, by utilizing this characteristic, an output fluctuation parameter X that represents the degree of output fluctuation of the pre-catalyst sensor 17 is used as a parameter that represents the degree of variation in the air/fuel ratio among the cylinders, and the output fluctuation parameter X is detected.

Figure 9:
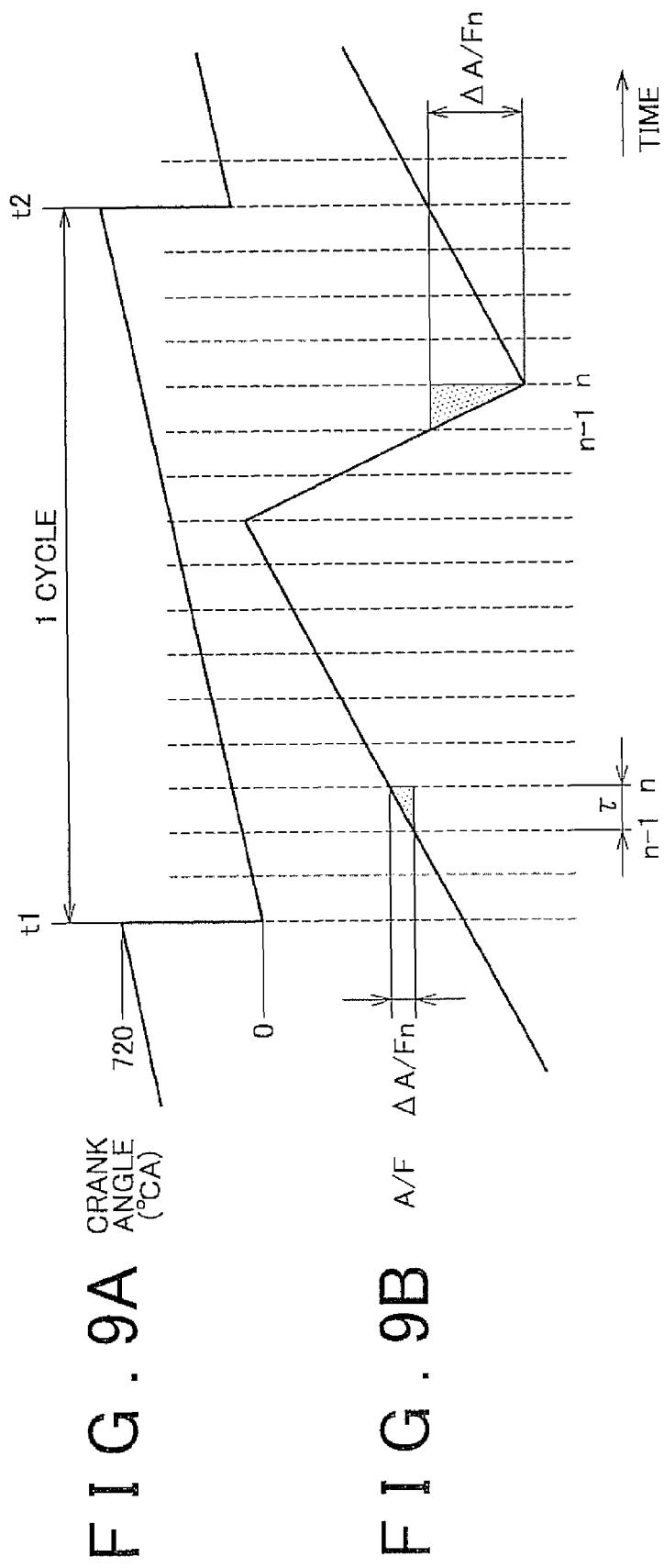
FIGS. 9A and 9B are enlarged diagrams that correspond to a portion U of FIGS. 8A and 8B.

A detection method for an output fluctuation parameter X will be described below. FIGS. 9A and 9B are enlarged diagrams that correspond to a portion U in FIGS. 8A and 8B, showing particularly fluctuations of the output of the pre-catalyst sensor within one engine cycle in a simplified manner. As the pre-catalyst sensor output, a value of the air/fuel ratio A/F converted from the output voltage Vf of the pre-catalyst sensor 17 is used. However, the output voltage Vf of the pre-catalyst sensor 17 may also be directly used.

As shown in FIG. 9B, the ECU 20 acquires a value of the pre-catalyst sensor output A/F at every predetermined sampling period τ (unit time, e.g., 4 ms) within one engine cycle. Then, a difference ΔA/Fn between the value A/Fn acquired at the present timing (second timing) and the value A/Fn−1 acquired at the previous timing (first timing) is found by the following expression (3). This difference ΔA/Fn can also be referred to as a differential value or a slope at the present timing.

$$\Delta A/F_n = A/F_n - A/F_{n-1} \qquad \text{Expression 3}$$

Most simply, the difference ΔA/Fn represents fluctuation of the pre-catalyst sensor output. As the degree of fluctuation is greater, the slope of the air/fuel ratio graph is greater and the absolute value of the difference ΔA/Fn is greater. The absolute valued of the difference ΔA/Fn at a predetermined timing can be used as an output fluctuation parameter.

However, in this embodiment, an average value of the absolute values of a plurality of differences ΔA/Fn is used as the output fluctuation parameter in order to improve accuracy. In this embodiment, the absolute value of the difference ΔA/Fn is added at every timing during one engine cycle, and the final accumulated value is divided by the number N of samples to find an average value of the absolute values of differences ΔA/Fn in one engine cycle. Then, the average values of the absolute values of differences ΔA/Fn in M number of engine cycles (e.g., M=100) are accumulated, and the final accumulated value is divided by the number M of engine cycles to find an average value of the absolute values of differences ΔA/Fn in M number of engine cycles. The final average value found in this manner is set as an output fluctuation parameter X. The output fluctuation parameter X is greater as the degree of fluctuation of the pre-catalyst sensor output is greater.

Incidentally, since the difference A/F regarding the pre-catalyst sensor increases in a case and decreases in another case, the difference ΔA/Fn or the average value thereof may be found with regard to only one of the two cases, and the average value may be used as an output fluctuation parameter. In particular, in the case of rich deviation of one cylinder alone, the output of the pre-catalyst sensor rapidly changes to the rich side (i.e., sharply decreases) when the pre-catalyst sensor receives the exhaust gas that corresponds to that cylinder of rich deviation, and therefore it is also possible to use only values of output of the pre-catalyst sensor on the decrease side for the purpose of detecting rich deviation. However, this is not restrictive, and the use of only values on the increase side is also possible. In the embodiment, as described below, it is determined whether the variation abnormality in the air/fuel ratio among the cylinders is present by using the output fluctuation parameter X, and it is determined whether the variation is a rich deviation or a lean deviation on the basis of comparison between an average value of the absolute values of only differences ΔA/F that occur when the pre-catalyst sensor output decreases and an average value of the absolute values of only differences ΔA/F that occur when the pre-catalyst sensor output increases.

Figure 10:
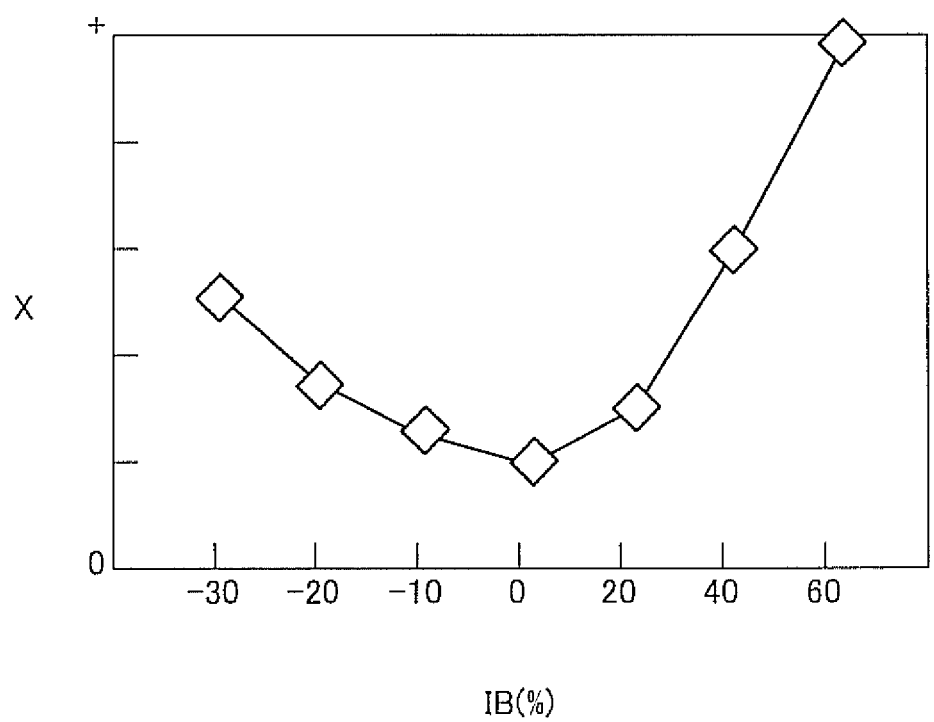
FIG. 10 is a graph showing a relation between imbalance rate and an output fluctuation parameter.

FIG. 10 shows a relation between the imbalance rate IB (%) and the output fluctuation parameter X. As shown in FIG. 10, the imbalance rate IB and the output fluctuation parameter X have a strong correlation in which as the absolute value of the imbalance rate IB increases, the air/fuel ratio output parameter X increases.

Therefore, it is possible to detect the variation abnormality in the air/fuel ratio among the cylinders on the basis of the output fluctuation parameter X. Specifically, if the value of the output fluctuation parameter X is greater than or equal to a predetermined abnormality criterion value, it is determined that the variation abnormality is present. If the value of the output fluctuation parameter X is less than the abnormality criterion value, it is determined that there is no such abnormality, that is, the present state is normal.

Figure 11:
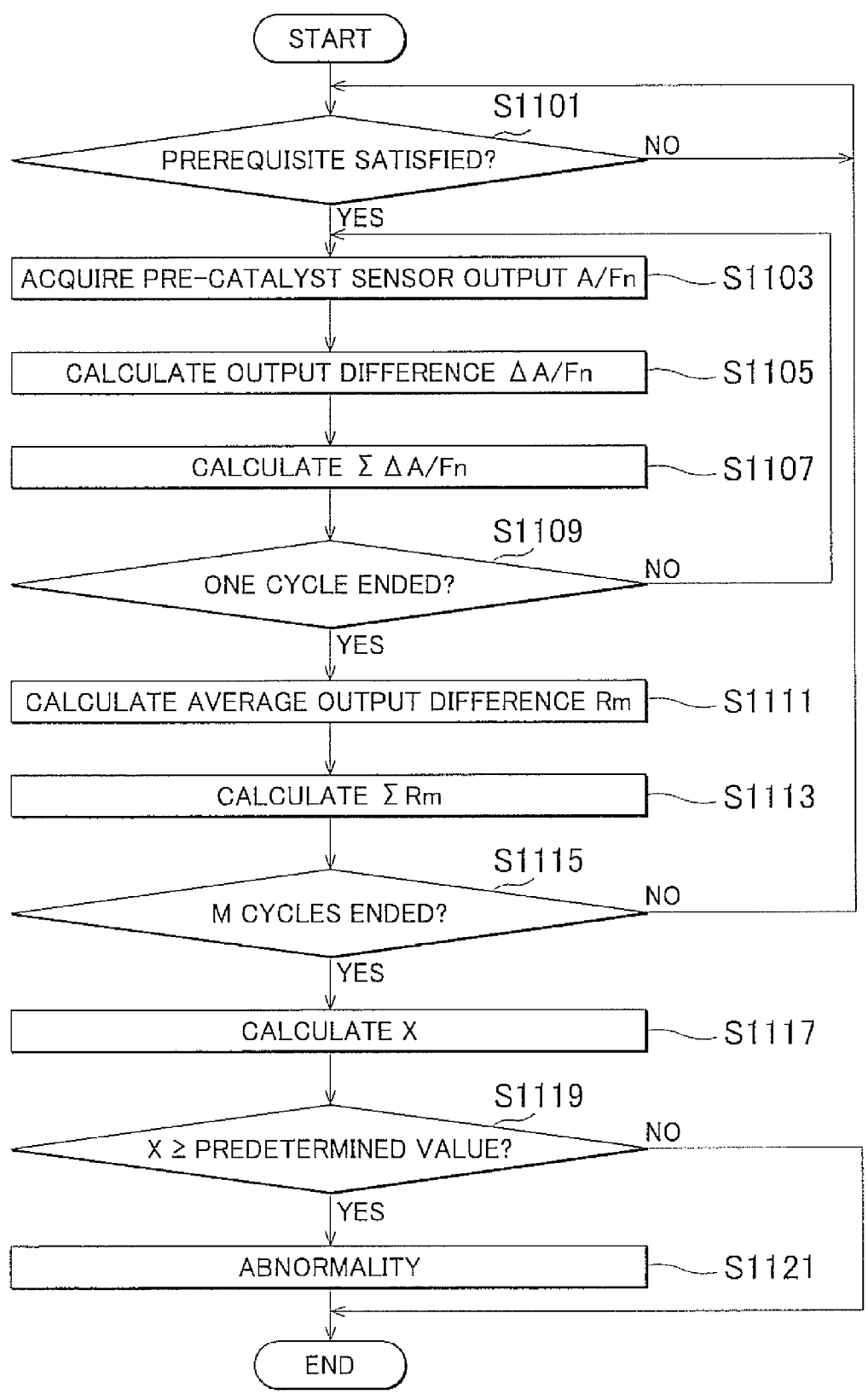
FIG. 11 is a flowchart of a detection routine of a variation abnormality in the air/fuel ratio among the cylinders.

A control detecting the variation abnormality in the air/fuel ratio among the cylinders as mentioned above will be described with reference to the flowchart shown in FIG. 11. Execution of the routine shown in FIG. 11 is repeated by the ECU 20 at every predetermined computation period τ.

Firstly, in step S1101, it is determined whether a predetermined prerequisite suitable for executing the detection of the output fluctuation parameter X is satisfied. This prerequisite is satisfied, for example, when the following conditions are satisfied.

(1) The warm-up of the engine has been completed. Herein, the ECU 20 determines that the warm-up of the engine has been completed when the engine coolant temperature detected by an engine coolant temperature sensor (not shown) is above a predetermined value (e.g., 75°C.). It is also permissible to provide an oil temperature sensor for detecting the temperature of engine oil and to determine that the warm-up has been completed when the detected oil temperature is above a predetermined value.

(2) The pre-catalyst sensor 17 and the post-catalyst sensor 18 have been activated. The ECU 20 determines that the two sensors have been activated when the impedance of each sensor is equal to a value that corresponds to a predetermined activation temperature of the sensor.

(3) The catalyst of the upstream catalytic converter 11 and the catalyst of the downstream catalytic converter 19 have been activated. The ECU 20 determines that the catalysts of the two catalytic converters have been activated when each of the temperature of the catalyst of the upstream catalytic converter 11 and the temperature of the catalyst of the downstream catalytic converter 19 estimated on the basis of the operation state of the engine has reached a value that corresponds to a predetermined activation temperature of the catalyst.

(4) The engine is steadily operating. The ECU 20 determines that the engine is steadily operating when the widths of fluctuation of the number of revolutions Ne and the load KL of the engine within a predetermined time are less than or equal to their respective predetermined values.

(5) The usual air/fuel ratio feedback control is being executed.

If the prerequisite is not satisfied, a negative determination is made in step S1101. On the other hand, if the prerequisite is satisfied, an affirmative determination is made in step S1101. Then, in step S1103, the pre-catalyst sensor output A/Fn at the present timing is acquired. The pre-catalyst sensor output A/Fn is a value of air/fuel ratio converted from the output voltage Vf of the pre-catalyst sensor 17.

Next, in step S1105, the output difference ΔA/Fn at the present computation timing is calculated by the foregoing expression (3).

Subsequently, in step S1107, the absolute value of the output differences ΔA/Fn is added to the accumulated value, that is, an accumulated output value ΣΔA/Fn at the present timing is calculated by the following expression 4.

$$\Sigma \Delta A/F_n = \Sigma \Delta A/F_{n-1} + |\Delta A/F_n| \qquad \text{Expression 4}$$

Next, in step S1109, it is determined whether one engine cycle has ended. If one engine cycle has not ended, the process returns to step S1103. If one engine cycle has ended, the process proceeds to step S1111.

In step S1111, a final accumulated output value $\Sigma\Delta A/FN$ at the time point of the present end of one engine cycle is averaged by dividing it by the number N of samples, so that an average output difference Rm is calculated.

Then, in step S1113, the average output difference Rm is added to the accumulated value, that is, an accumulated average output difference $\Sigma Rm$ at the time of the present end of one engine cycle is calculated by the following expression (5).

$$\Sigma R_m = \Sigma R_{m-1} + R_m \qquad \text{Expression 5}$$

Next, in step S1115, it is determined whether M number of engine cycles (where M is an integer greater than or equal to 2) have ended. If not, the process returns to step S1101. If M engine cycles have ended, the process proceeds to step S1117.

In step S1117, a final accumulated average output difference $\Sigma RM$ at the time point of end of the M engine cycles is averaged by dividing it by the number M of cycles, whereby an output fluctuation parameter X is calculated. The thus-calculated output fluctuation parameter X is set as an output fluctuation parameter X that is a final detected value.

Then, in step S1119, the output fluctuation parameter X is compared with a predetermined abnormality criterion value. If the parameter X is greater than or equal to the predetermined abnormality criterion value and therefore an affirmative determination is made in step S1119, an abnormality flag, whose initial state is an of state, is turned on in step S1121 so as to determine (detect) that there is abnormality, that is, the variation abnormality in the air/fuel ratio among the cylinders is present. On the other hand, if the parameter is X is less than the predetermined abnormality criterion value and therefore a negative determination is made in step S1119, the abnormality flag is not turned on, that is, is left off, so as to determine that the present state is normal, and then the routine ends. In this embodiment, when the abnormality flag is turned on, a warning lamp (not shown) or the like provided in a front panel at the driver's seat side or the like is lit, prompting the driver or the like to have repair or maintenance, or the like.

It is to be noted herein that the control of detecting the variation abnormality in the air/fuel ratio among the cylinders described above with reference to FIG. 11 is executed only once during the period from when the engine 1 is started to when the engine 1 is stopped. However, this control may also be executed at appropriate timing. For example, the control can be executed when the operation time of the engine 1 or the travel distance of the vehicle equipped with the engine 1 becomes equal to a predetermined value.

Figure 12:
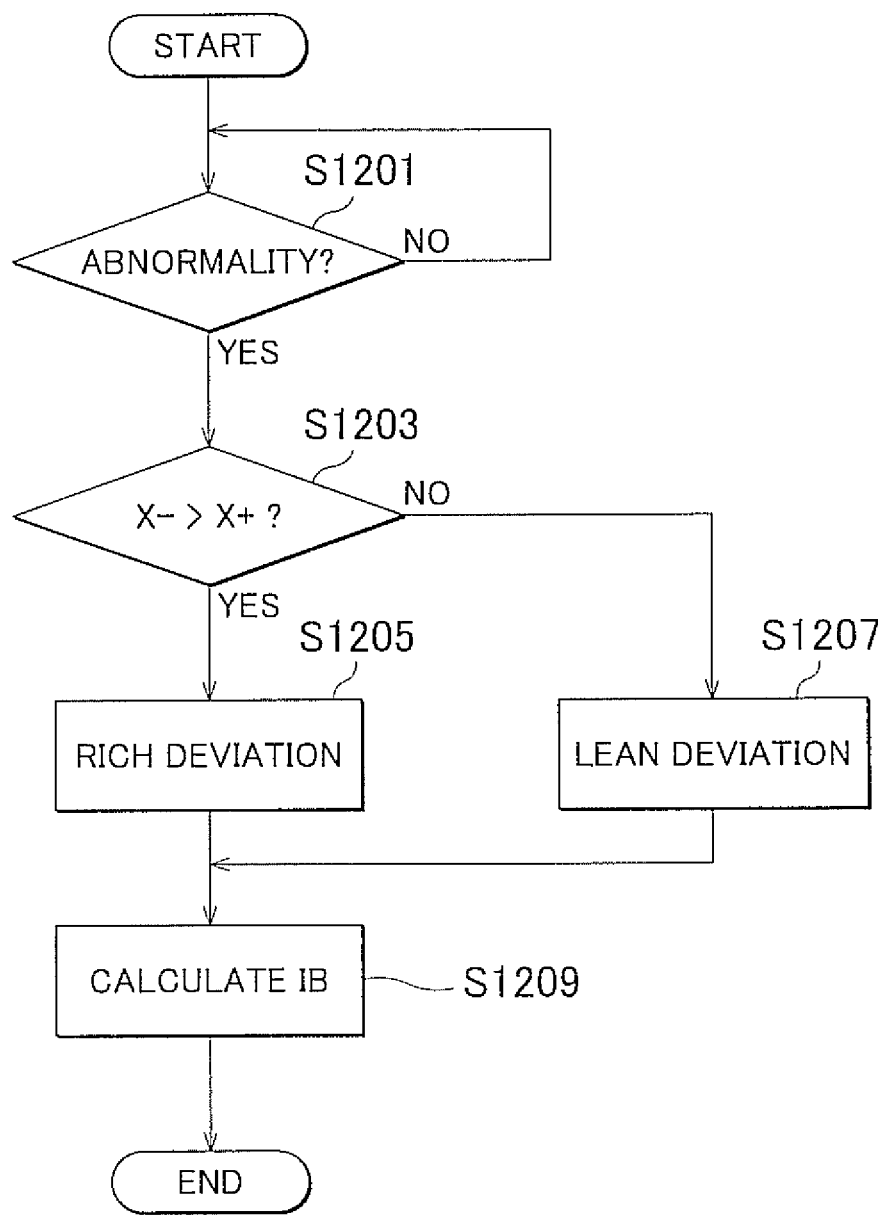
FIG. 12 is a flowchart of an imbalance rate detection routine.

Furthermore, when the abnormality flag is turned on, it is assumed that only one of the cylinders has a fuel injection amount deviation, pursuant to the flowchart of FIG. 12, and then the aforementioned imbalance rate that is a value that shows by what percentage the fuel injection amount of the cylinder having a fuel injection amount deviation is deviated from the fuel injection amount of each of the cylinders that do not have any fuel injection amount deviation is found. Derivation of the imbalance rate is substantially executed by a portion of the ECU 20 which performs the function of an imbalance rate derivation portion of the abnormality detection means which is configured to derive the imbalance rate. Incidentally, the imbalance rate derivation portion may be referred to as the parameter derivation portion or the value derivation portion. The derivation of the imbalance rate is executed for the control described below.

In step S1201, it is determined whether there is abnormality, that is, whether the variation abnormality in the air/fuel ratio among the cylinders is present. If the abnormality flag is on in step S1121 in FIG. 11, it is determined in step S1201 that the variation abnormality in the air/fuel ratio among the cylinders is present on the basis of the abnormality flag.

If an affirmative determination is made in step S1201, the process proceeds to step S1203, in which an average value of the absolute values of only differences $\Delta A/F$ that occur when the pre-catalyst sensor output decreases, that is, a negative-side parameter $X(-)$ regarding differences $\Delta A/F$ that are negative values, is compared with an average of the absolute values of only differences $\Delta A/F$ that occur when the pre-catalyst sensor output increases, that is, a positive-side parameter $X(+)$ regarding differences $\Delta A/F$ that are positive values. It is to be noted herein that the negative-side parameter $X(-)$ and the positive-side parameter $X(+)$ are calculated in substantially the same manner as in the calculation of the parameter X described above with reference to the flowchart of FIG. 11. Calculation of the parameter $X(-)$ and the parameter $X(+)$ is performed on the basis of the output difference $\Delta A/F$ calculated in step S1105. That is, the output differences $\Delta A/F$ have been stored in the storage device, and calculation of the parameters $X(-)$ and $X(+)$ is performed by using output differences $\Delta A/F$ from the storage device only when the variation abnormality in the air/fuel ratio among the cylinders is detected. However, the calculation of the parameters $X(-)$ and $X(+)$ may be performed concurrently with the calculation of the parameter X pursuant to the flowchart of FIG. 11.

For example, in the case of rich deviation of one cylinder alone, the output of the. pre-catalyst sensor 17 rapidly changes to the rich side (i.e., sharply decreases) when the pre-catalyst sensor 17 receives the exhaust gas that corresponds to that cylinder of rich deviation, and therefore the negative-side parameter $X(-)$ is a value that strongly reflects the influence of the rich deviation. Likewise, in the case of lean deviation of one cylinder alone, the output of the pre-catalyst sensor 17 rapidly changes to the lean side i.e., sharply increases) when the pre-catalyst sensor 17 receives the exhaust gas that corresponds to that cylinder of lean deviation, and therefore the positive-side parameter $X(+)$ is a value that strongly reflects the influence of the lean deviation.

Therefore, if the negative-side parameter $X(-)$ is greater than the positive-side parameter $X(+)$ and therefore an affirmative determination is made in step S1203, a rich-deviation flag, which is off in an initial state, is turned on in step S1205, so that it will be determined that the air/fuel ratio of the imbalance cylinder, that is, the abnormal cylinder, is deviated to the rich side of the stoichiometric ratio. Conversely, if the negative-side parameter $X(-)$ is not greater than the positive-side parameter $X(+)$ and therefore a negative determination is made in step S1203, a lean-deviation flag, which is off in an initial state, is turned on in step S1207, so that it will be determined that the air/fuel ratio of the imbalance cylinder is deviated to the lean side of the stoichiometric ratio. In the case where the negative-side parameter $X(-)$ and the positive-side parameter $X(+)$ are equal, the process proceeds with an assumption that the air/fuel ratio of the imbalance cylinder is deviated to the lean side in this example. However, it is also permissible that, in that case, the process proceed with an assumption that the air/fuel ratio of the imbalance cylinder is deviated to the rich side of the stoichiometric ratio. However, the case where the negative-side parameter $X(-)$ and the positive-side parameter $X(+)$ are equal is practically unthinkable when the variation abnormality in the air/fuel ratio among the cylinders is present. Hence, the case where the negative-side parameter $X(-)$ and the positive-side parameter $X(+)$ equal can be excluded. In that case, another process conceivable by a person with ordinary skill in the art may be executed.

Subsequently, in step S1209, an imbalance rate IB (%) is calculated by searching the data as expressed in FIG. 10 with reference to the output fluctuation parameter X calculated in step S1117, and by using, as a basis, the manner of deviation of the exhaust air/fuel ratio which is determined in the process of steps S1203 to S1207.

By the way, even when the variation abnormality in the air/fuel ratio among the cylinders is present, it is permissible to appropriately remove pollutants in exhaust gas by using the catalysts in the exhaust passageway. To that end, in this embodiment, it is necessary to control the exhaust air/fuel ratio substantially to the stoichiometric ratio as is apparent from the foregoing description.

As described above with reference to FIGS. 8A and 8B, the larger the degree of variation in air/fuel ratio among the cylinders, the larger the degree of variation in the exhaust air/fuel ratio; furthermore, when the variation abnormality in the air/fuel ratio among the cylinders is present, the exhaust air/fuel ratio detected by the pre-catalyst sensor 17 greatly varies. How exhaust gas impacts or strikes the pre-catalyst sensor 17 or how exhaust gas flows around the pre-catalyst sensor 17 varies depending on the cylinders. For example, the exhaust gas from the #1 cylinder and the exhaust gas from the #4 cylinder are different from each other in the manner and degree of the exhaust gas reaching the pre-catalyst sensor 17. Therefore, when the variation abnormality in the air/fuel ratio among the cylinders is present, it is difficult to carry out sufficient control of the exhaust air/fuel ratio by the above-described main air/fuel ratio feedback control of causing the exhaust air/fuel ratio detected by the pre-catalyst sensor 17 to be equal to a predetermined target air/fuel ratio and, in particular, the stoichiometric ratio.

As for the exhaust gas having passed through the catalytic converter 11, generally, since exhaust gases from the individual cylinders are not thoroughly or sufficiently mixed, the presence of the variation abnormality in the air/fuel ratio among the cylinders results in that the exhaust air/fuel ratio detected by the post-catalyst sensor 18 is not an average air/fuel ratio regarding all the cylinders. Therefore, there is a limit in the control of the exhaust air/fuel ratio despite execution of the auxiliary air/fuel ratio feedback control in which the exhaust air/fuel ratio detected through the use of the post-catalyst sensor 18 is caused to be equal to a predetermined target air/fuel ratio and, particularly, to the stoichiometry ratio.

Furthermore, the amount of hydrogen contained in exhaust gas when the variation abnormality in the air/fuel ratio among the cylinders is present is different from that contained when the abnormality is not present. Since hydrogen is detectable by the pre-catalyst sensor 17, and is removable by the catalysts provided in the exhaust passageway, it can happen that the detected value based on output of the pre-catalyst sensor 17 and the detected value based on output of the post-catalyst sensor 18 deviate or depart greatly from each other in the case where the variation abnormality in the air/fuel ratio among the cylinders is present.

For example, if such an abnormality as to affect all the cylinders occurs in the fuel supply system, including the injectors or the like, the air system, including the air flow meter or the like, the absolute value of the feedback correction amount in the main air/fuel ratio feedback control becomes large. For example, if the amount of fuel injection is generally deviated by 5% from the stoichiometric ratio-corresponding amount (i.e., if in all the cylinders, the amount of fuel injection is deviated by 5% from the stoichiometric ratio-corresponding amount), the feedback correction amount in the main air/fuel ratio control is caused to be a value that corrects the 5% deviation, that is, a correction amount that corresponds to the 5% deviation.

In another case, that is, a case where instead of the fuel supply system or the air system having an overall deviation from the normal state, there occurs an variation in the air/fuel ratio among the cylinders, that is, an imbalance, will be considered below. For example, let it assumed that the injector of the #1 cylinder has abnormality, and the amount of fuel injection of the #1 cylinder is deviated from the stoichiometric ratio-corresponding amount greatly by 20% while the #2 to #4 cylinders are normal and have an amount of fuel injection that is equal to the stoichiometric ratio-corresponding amount. In a total view, the deviation is 20% (20+0+0+0=20), which must be equivalent to the total deviation that occurs in the case where each cylinder has a deviation of 5% (5+5+5+5=20).

However, in the case where one cylinder alone has a great rich-side deviation in air/fuel ratio, the amount of hydrogen produced from the combustion cylinder is greater than in the case where all the cylinders have uniformly small rich-deviations in air/fuel ratio. Since the amount of oxygen in exhaust gas decreases by an amount that corresponds to the increase of the amount of hydrogen, the output of the pre-catalyst sensor 17 deviates more greatly to the rich side when one cylinder alone has a deviation in air/fuel ratio than when all the cylinders have uniform deviations.

Figure 13:
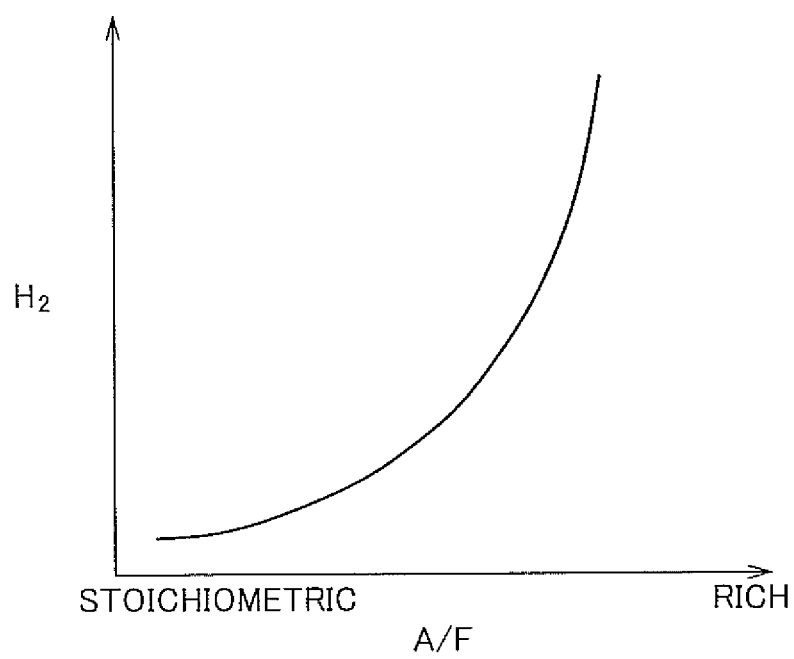
FIG. 13 is a graph showing a relation between the air/fuel ratio and the amount of hydrogen in exhaust gas discharged into an exhaust passageway.

FIG. 13 shows a relation between the amount of air/fuel ratio deviation of the mixture of one cylinder to the rich side (horizontal axis) and the amount of oxygen produced in the combustion chamber (vertical axis). As shown in FIG. 13, the produced hydrogen amount quadratically increases with increases in the air/fuel ratio rich-deviation amount. Hence, when one cylinder alone has a deviation of 20% to the rich side, more hydrogen is produced than in the case where all the cylinders have a deviation of 5% to the rich side, and the pre-catalyst sensor output Vf assumes values more to the rich side than in that case.

If the air/fuel ratio deviation remains the same as a total, emissions deteriorate more when there is a variation in air/fuel ratio among the cylinders than when the air/fuel ratios of the cylinders are deviated altogether. In the latter case, for example, when each cylinder has a deviation of 5% in air/fuel ratio, performance of the auxiliary air/fuel ratio feedback control with a correction of −5% will eliminate the deviation of 5% uniformly for all the cylinders. However, in the former case, for example, when the air/fuel ratio of one cylinder (e.g., the #1 cylinder) alone is deviated by 20%, the connection of −5% by the auxiliary air/fuel ratio feedback control results in deviations of 15% for the #1 cylinder, −5% for the #2 cylinder, −5% for the #3 cylinder and −5% for the #4 cylinder. In this case, the air/fuel ratio deviation appears to have been eliminated in total (15+(−5)+(−5)+(−5)=0), but actually each cylinder has an air/fuel ratio deviation, so that emissions deteriorate on a cylinder-by-cylinder basis.

In the case where exhaust gas contains hydrogen, the hydrogen can be removed from exhaust gas through oxidation (combustion) by allowing the catalyst to interact with the exhaust gas. In this case, the air/fuel ratio of the exhaust gas that has not passed through the catalyst and therefore contains hydrogen, that is, a first exhaust air/fuel ratio, is detected by the pre-catalyst sensor 17, and the air/fuel ratio of the exhaust gas that has passed through the catalyst and from which hydrogen has been removed, that is, a second air/fuel ratio, is detected by the post-catalyst sensor 18. The detected value provided by the pre-catalyst sensor 17 is deviated to the rich side of the detected value provided by the post-catalyst sensor 18, due to the effect of hydrogen. Conversely, the detected value provided by the post-catalyst sensor 18 is deviated to the lean side of the detected value provided by the pre-catalyst sensor 17, due to the effect of hydrogen.

That is, the detected value provided by the post-catalyst sensor 18 subsequent to the removal of hydrogen can be said to reflect the true exhaust air/fuel ratio, and the detected value provided by the pre-catalyst sensor 17 prior to the removal of hydrogen concerns the exhaust air/fuel ratio which includes a value that corresponds to the amount of hydrogen and therefore which is deviated to the rich side of the true exhaust air/fuel ratio on an apparent basis. Therefore, it can be said that the pre-catalyst sensor 17 is "fooled". If the air/fuel ratio rich-deviation amount of at least one of the cylinders to the remainder cylinders increases, the amount of hydrogen correspondingly increases quadratically. Hence, when the variation abnormality in the air/fuel ratio among the cylinders is present, there is a tendency that the detected value provided by the pre-catalyst sensor 17 is greatly deviated to the rich side of the detected value provided by the post-catalyst sensor 18, that is, the detected value provided by the post-catalyst sensor 18 is greatly deviated to the lean side of the detected value provided by the pre-catalyst sensor 17.

For example, let it assumed that the #1 cylinder alone has an injector abnormality such that the air/fuel ratio of the #1 cylinder is greatly deviated to the rich side of the air/fuel ratio of the #2 to #4 cylinders. In this case, the main air/fuel ratio feedback control is being executed, so that the air/fuel ratio of total exhaust gas provided by confluence of exhaust gas from all the cylinders, that is, the air/fuel ratio detected by using the pre-catalyst sensor 17, is controlled to the vicinity of the stoichiometric ratio. That is, the pre-catalyst sensor output Vf is in the vicinity of the stoichiometric ratio-corresponding sensor output Vreff. However, in this case, the air/fuel ratio of the #1 cylinder is greatly richer than the stoichiometric ratio, and the air/fuel ratio of the #2 to #4 cylinders is leaner than the stoichiometric ratio, so that a near-stoichiometric ratio is obtained merely as an overall balance. Furthermore, as a result of the production of a large amount of hydrogen from the #1 cylinder, the output Vf of the pre-catalyst sensor 17 falsely represents the stoichiometric ratio, which in this case is an air/fuel ratio (a false air/fuel ratio) that is deviated to the rich side of the true air/fuel ratio.

As exhaust gas containing hydrogen passes through the upstream catalyst converter 11, the hydrogen is removed and therefore the influence thereof is eliminated. Therefore, the output Vr of the post-catalyst sensor 18 gives a representation that corresponds to the true air/fuel ratio, that is, an air/fuel ratio that is leaner than the stoichiometric ratio. That is, the post-catalyst sensor output Vr is a low value that is to the lean side of the stoichiometric ratio-corresponding sensor output Vrefr.

In another view, in order to correct a rich deviation of, for example, 25 in total, in the detected value of the pre-catalyst air/fuel ratio, a lean correction of −25 is carried out by the main air/fuel ratio feedback control to bring to zero the rich deviation of the detected value of the pre-catalyst air/fuel ratio. However, the amount of 5, of 25, does not result from the genuine or actual air/fuel ratio deviation, but results from the influence of hydrogen, and therefore, the main air/fuel ratio feedback control provides an excessive correction of 5 to the lean side. Hence, this results in a deviation of 5 in the post-catalyst air/fuel ratio to the leaner side.

Hence, despite the main air/fuel ratio feedback control controlling the pre-catalyst air/fuel ratio to the stoichiometric ratio, the post-catalyst sensor 18 continuously detects a value that corresponds to a post-catalyst air/fuel ratio that is leaner than the stoichiometric ratio (i.e., the post-catalyst sensor output sticks to the lean side). This difference between the pre and post-catalyst air/fuel ratios is attributed to a conspicuously large production of hydrogen due to failure of the injectors of one or more cylinders, etc.

When one cylinder alone has a large deviation in air/fuel ratio to the lean side, the amount of hydrogen produced from the combustion chamber concerned is larger than when all the cylinders have small equal deviations in air/fuel ratio to the lean side. For example, when each cylinder has a deviation of −5% in air/fuel ratio, a correction of, for example, +5%, by the auxiliary air/fuel ratio feedback control will uniformly eliminate the deviations of 5% of all the cylinders. However, when the air/fuel ratio of one cylinder alone is greatly deviated to the lean side, for example, when the air/fuel ratio of one cylinder alone is deviated by 20%, the correction of +5% by the auxiliary air/fuel ratio feedback control results in deviations of −15% for the #1 cylinder, +5% for the #2 cylinder, +5% for the #3 cylinder and +5% for the #4 cylinder. In this case, the air/fuel ratio deviation appears to have been eliminated in total ((−15)+(+5)+(+5)+(+5)=0), but actually each cylinder has an air/fuel ratio deviation, so that emissions deteriorate on a cylinder-by-cylinder basis. In this case, since hydrogen is produced from the three cylinders whose air/fuel ratios are deviated to the rich side as can be understood from the foregoing description, the post-catalyst sensor 18 continuously detects a value that corresponds to the post-catalyst air/fuel ratio that is leaner than the stoichiometric ratio, despite the pre-catalyst air/fuel ratio being controlled to the stoichiometric ratio by the main air/fuel ratio feedback control.

Therefore, when the variation abnormality in the air/fuel ratio among the cylinders as described above is present, it is difficult to appropriately control the exhaust air/fuel ratio to the stoichiometric ratio by employing the usual air/fuel ratio feedback control described above.

Hence, in this example, when the variation abnormality in the air/fuel ratio among the cylinders is present, the target value regarding the post-catalyst sensor 18 in the auxiliary air/fuel ratio feedback control is changed from the stoichiometric ratio-corresponding value. It is to be noted that the amount of change of the target value is determined beforehand by experiments by taking into account how exhaust gas from each cylinder impacts on the post-catalyst sensor 18 and the characteristics of change of the components of exhaust gas during the presence of the variation abnormality in the air/fuel ratio among the cylinders. In particular, the amount of change of the target value is determined by paying attention to the magnitude of the influence of exhaust gas from each cylinder to the detected value provided by the post-catalyst sensor 18.

Figure 14:
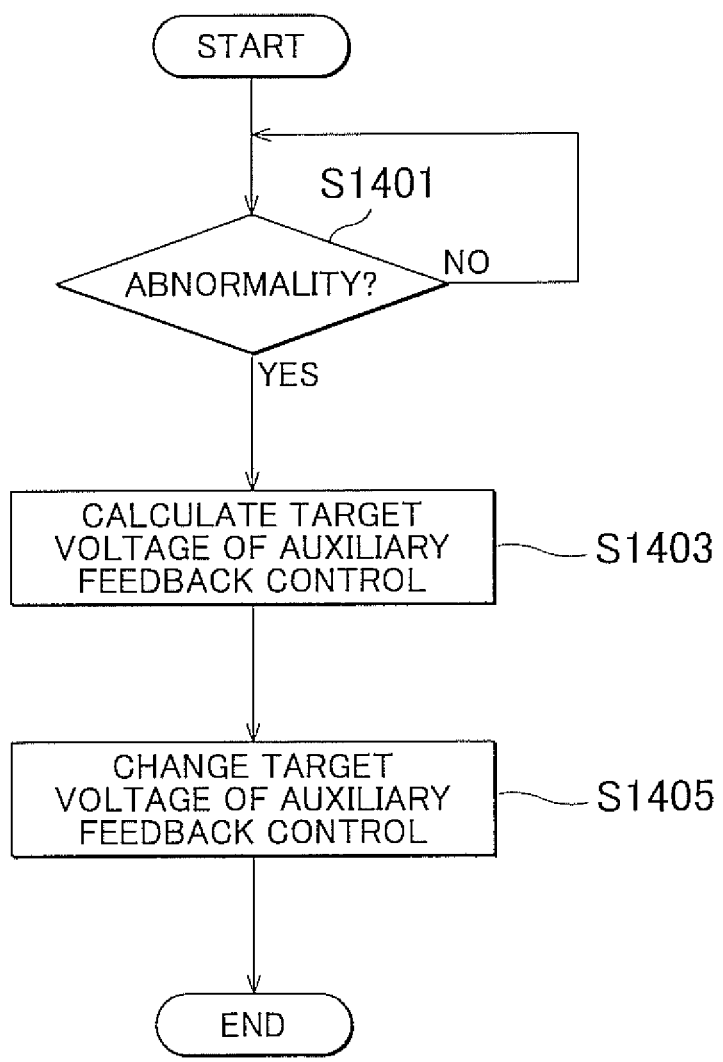
FIG. 14 is a flowchart of a target voltage changing routine in an auxiliary air/fuel ratio feedback control.

Herein, a control of changing the target value in the auxiliary air/fuel ratio feedback control will be described with reference to a flowchart shown in FIG. 14. The changing of the target value by the auxiliary air/fuel ratio feedback control is substantially executed by a portion of the ECU 20 that performs the function of change means.

In step S1401, it is determined whether abnormality is present, that is, whether the variation abnormality in the air/fuel ratio among the cylinders is present. If the abnormality flag is turned on in step S1121 in FIG. 11, it is determined in step S1401 that the variation abnormality in the air/fuel ratio among the cylinders is present on the basis of the abnormality flag.

Figure 15:
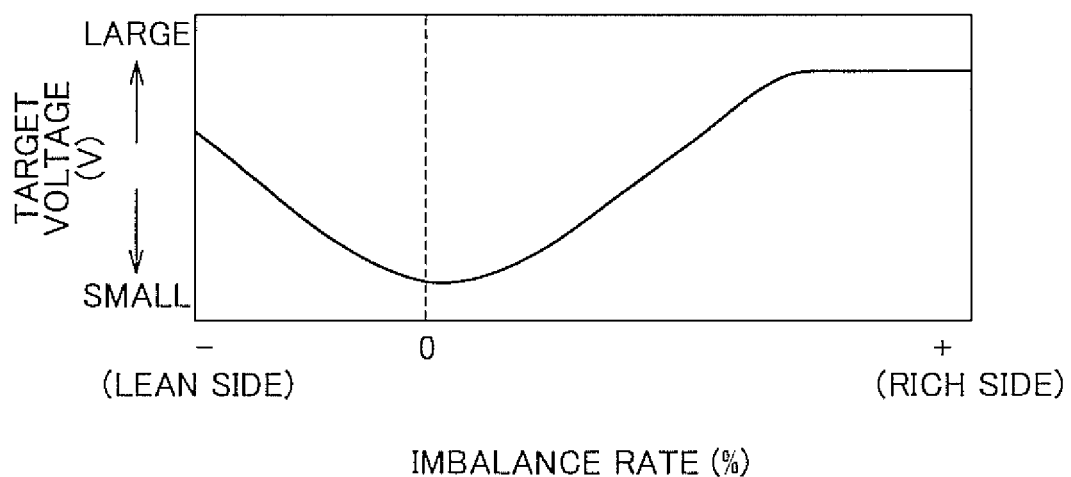
FIG. 15 is a graph showing a relation between the imbalance rate and the target voltage.

If an affirmative determination is made in step S1401, a target voltage of the auxiliary air/fuel ratio feedback control is calculated in step S1403. The target voltage is found by searching the mapped data as expressed in FIG. 15 with reference to the imbalance rate calculated in step S1209 in FIG. 12. The data as expressed in FIG. 15 are determined beforehand by experiments so as to suite appropriately and similarly to practically all cases, regardless of which one or more of the cylinders have problem, taking into account how exhaust gas from each cylinder impacts on the post-catalyst sensor 18, and the characteristic of change of the components (e.g., $H_2$) of exhaust gas at the time of presence of the variation abnormality in the air/fuel ratio among the cylinders, that is, the degree of departure of the detected value provided by the post-catalyst sensor 18 from a true-air/fuel ratio-corresponding value. However, the target voltage found in this operation is defined or confined within a prescribed guard range. The data shown in FIG. 15 are determined so that the larger the degree of variation in air/fuel ratio among the cylinders, the larger the amount of change of the target voltage of the auxiliary air/fuel ratio feedback control.

Then, in step S1405, the target value of the auxiliary air/fuel ratio feedback control that, in an initial state, is set at the aforementioned stoichiometric ratio-corresponding sensor output Vrefr, which is a stoichiometric ratio-corresponding value, is changed to the target voltage calculated as described above. Thus, after this, the target voltage calculated in step S1403 is used as the target value of the auxiliary air/fuel ratio feedback control (that corresponds to a second predetermined target value in the invention), and the auxiliary air/fuel ratio feedback control is executed so that the second detected value based on the output of the post-catalyst sensor 18 follows to be equal as the target voltage value.

From FIG. 15, it can be understood that the target voltage after being changed is larger than approximately the stoichiometric ratio-corresponding value (e.g., 0.45 V) (i.e., is a voltage to the rich side of the stoichiometric ratio-corresponding value). This is because when the variation abnormality in the air/fuel ratio among the cylinders is present, the detected value provided by the post-catalyst sensor 18 strongly tends to be deviated to the lean side of the stoichiometric ratio. However, although not shown clearly in FIG. 15, it can happen that the target voltage after being changed is smaller than the stoichiometric ratio-corresponding value (deviates to the lean side thereof). This depends on, for example, the configuration of the exhaust system of the engine, including the shape, size, etc. However, the invention does not exclude such construction of data or the like that the post-change target voltage of the auxiliary air/fuel ratio feedback control is always larger than the stoichiometric ratio-corresponding value.

As stated above, in the engine in accordance with the first embodiment, the pre-catalyst sensor 17 as first air/fuel ratio detection means and the post-catalyst sensor 18 as second air/fuel ratio detection means are provided at positions forward and rearward of the catalyst in the exhaust passageway, respectively. During the initial state, the state immediately after the engine is started, and the state in which the variation abnormality in the air/fuel ratio among the cylinders is not detected, the main air/fuel ratio feedback control is executed so that the detected value provided by the pre-catalyst sensor 17 follows to be equal as the stoichiometric ratio-corresponding value that is the first predetermined target value, and the auxiliary air/fuel ratio feedback control is executed so that the detected value provided by the post-catalyst sensor 18 follows to be equal as the stoichiometric ratio-corresponding value that is the second predetermined target value. The main and auxiliary air/fuel ratio feedback controls are both executed as air/fuel ratio feedback controls in this embodiment. However, in the case where the variation abnormality in the air/fuel ratio among the cylinders is detected, the first predetermined target value of the main air/fuel ratio feedback control is not changed but the second predetermined target value of the auxiliary air/fuel ratio feedback control which, during the initial state, corresponds to (or is equivalent to) the first predetermined target value is changed to a value that is commensurate with the imbalance rate determined as described above. That is, the Second predetermined target value is changed to the amount that corresponds to the imbalance rate. For example, the second predetermined target value is changed from the stoichiometric ratio-corresponding value (e.g., 0.45 V) to a value on the rich side (e.g., 0.6 V).

As a result, the auxiliary air/fuel ratio feedback control is executed so as to cause the detected value provided by the post-catalyst sensor 18 to follow or equal the post-change second predetermined target value. For example, the case where the variation abnormality in the air/fuel ratio among the cylinders is present and therefore the detected value provided by the pre-catalyst sensor 17 is substantially equal to the stoichiometric ratio-corresponding value but the detected value provided by the post-catalyst sensor 18 is a low value on the lean side will be considered below. In this case, the detected value provided by the post-catalyst sensor 18 is the true value as stated above. At this time, if the auxiliary air/fuel ratio feedback control is executed so as to cause the detected value provided by the post-catalyst sensor 18 to follow or equal the post-change second predetermined target value (e.g., 0.6 V), the detected value provided by the pre-catalyst sensor 17 can deviate from the stoichiometric ratio as a result of the large correction made by the auxiliary air/fuel ratio feedback control. However, since there can occur a deviation or departure as described above between the detected value provided by the pre-catalyst sensor 17 and the detected value provided by the post-catalyst sensor 18, the detected value provided by the post-catalyst sensor 18 can be caused to be equal or close to the stoichiometric ratio-corresponding value. Therefore, it is possible to control the exhaust air/fuel ratio to the vicinity of the stoichiometric ratio while correcting the problem in the main air/fuel ratio feedback control which is involved with a detection error of the pre-catalyst sensor 17. Hence, exhaust gas can be appropriately controlled.

In the first embodiment, an average value of the absolute values of the output differences ΔA/Fn is used as the output fluctuation parameter X. However, for example, any value that correlates with the degree of fluctuation of the pre-catalyst sensor output can be used as the output fluctuation parameter. For example, an output fluctuation parameter can also be calculated on the basis of a difference between a maximum peak and a minimum peak (generally termed peak-to-peak difference) of the pre-catalyst sensor output in one engine cycle, or the absolute value of a maximum peak or a minimum peak of the second order differential value. This is because as the degree of fluctuation of the pre-catalyst sensor output is greater, the difference between the maximum peak and the minimum peak of the pre-catalyst sensor output is greater, and the absolute value of the maximum peak or the minimum peak of the second order differential value is also greater.

Furthermore, in the first embodiment, after the variation abnormality in the air/fuel ratio among the cylinders is detected, it is determined whether the abnormality is a result of rich deviation or lean deviation on the basis of a result of comparison between the negative-side parameter X(−) and the positive-side parameter X(+). However, whether it is rich deviation or lean deviation may be determined by other methods. An example of the other methods will be described with reference to FIGS. 16A to 16F. It is to be noted that the method described below with reference to FIGS. 16A to 16F may also be applied to the detection of the variation abnormality in the air/fuel ratio among the cylinders itself.

Figure 16A:
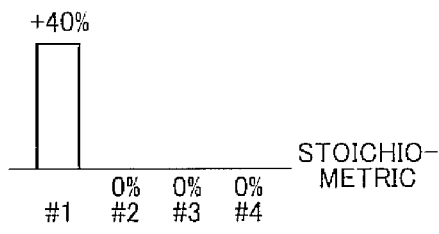
FIGS. 16A to 16F are diagrams for describing the principle of the determining of an abnormal cylinder.
Figure 16B:

For example, the case where, as shown in FIG. 16A, the fuel injection amount of the #1 cylinder alone is deviated to the rich side from the stoichiometric ratio-corresponding amount by a proportion of 40% (i.e., the imbalance rate is +40%) and where the fuel injection amounts of the other cylinders, that is, the #2, #3 and #4 cylinders, are equal to the stoichiometric ratio-corresponding amount (i.e., the imbalance rate is 0%) is assumed. At this time, if the usual air/fuel ratio feedback control is executed for a certain amount of time, the #1 cylinder has an imbalance rate of +30% and the #2, #3 and #4 cylinders have an imbalance rate of −10% as shown in FIG. 16B so that the fuel injection amount in total becomes equal to the stoichiometric ratio-corresponding amount. At this time, too, an injection amount deviation of the positive or negative sign (i.e., "+" or "−") relative to the stoichiometric ratio-corresponding amount occurs in the cylinders. Hence, a relatively large fluctuation in the exhaust air/fuel ratio occurs during one engine cycle, so that the value of the output fluctuation parameter X is large.

Figures 16C, 16D:
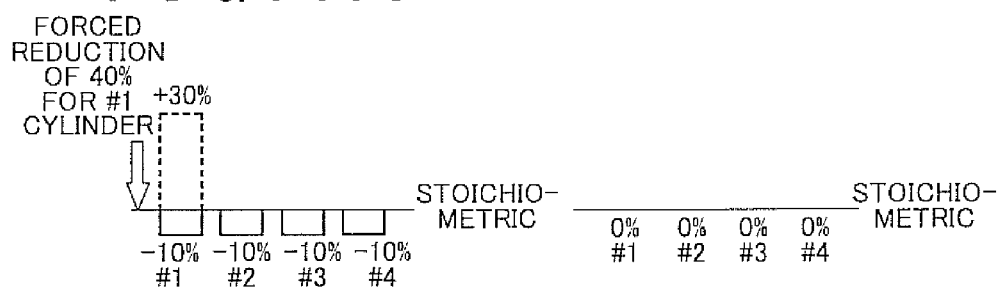

The fuel injection amount of the #1 cylinder is forced to decrease from the level shown in FIG. 16B, for example, by 40% of the stoichiometric ratio-corresponding amount, as shown in FIG. 16C. As a result of this, the imbalance rate of the #1 cylinder becomes −10%, which is equal to the imbalance rate of the #2, #3 and #4 cylinders.

If, from this state, the usual air/fuel ratio feedback control is executed for a certain amount of time while the state of reduced fuel injection amount of the #1 cylinder is maintained, the fuel injection amount of each cylinder is corrected by +10% as shown in FIG. 16D, so that the fuel injection amounts of the cylinders become equal to the. stoichiometric ratio-corresponding amount (i.e., the imbalance rate of each cylinder is 0%). Hence, the fluctuation of the exhaust air/fuel ratio during one engine cycle lessens, and the value of the output fluctuation parameter X lessens.

Therefore, a cylinder whose output fluctuation parameter X declines by a predetermined value or more when the fuel injection amount is forced to decrease by a predetermined amount can be specifically determined or determined as being an imbalance cylinder, that is, an abnormal cylinder, (in particular, a rich-deviation abnormality cylinder). That is, it can be specifically determined that rich deviation is present.

Figure 16E:
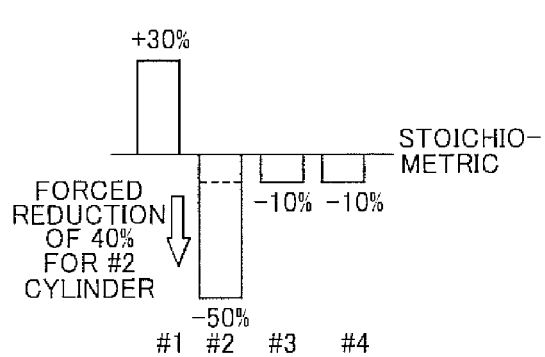

On another hand, let it assumed that the fuel injection amount of the #2 cylinder, which is normal, is forced to decrease from the level shown in FIG. 16B, for example, by 40% of the stoichiometric ratio-corresponding amount, as shown in FIG. 16E. As a result of this, the imbalance rate of the #1 cylinder remains unchanged, that is, +30%, and the imbalance rate of the #2 cylinder is −50%, and the imbalance rate of the #3 and #4 cylinders remains unchanged, that is, −10%.

Figure 16F:
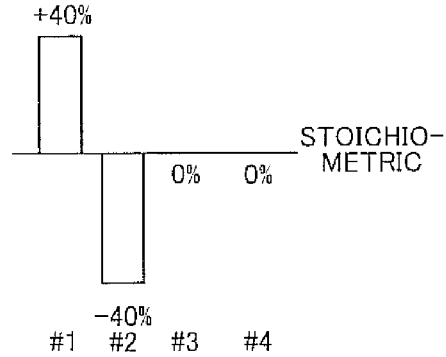

If, from this state, the usual air/fuel ratio feedback control is executed for a certain amount of time while the state of reduced fuel injection amount of the #2 cylinder is maintained, the imbalance rate of the #1 cylinder becomes +40% and the imbalance rate of the #2 cylinder becomes −40% and the imbalance rates of the #3 and #4 cylinders become 0% so that the total fuel injection amount becomes equal to the stoichiometric ratio-corresponding amount as shown in FIG. 16F. In this case, the fluctuation of the exhaust air/fuel ratio during one engine cycle remains still large, and the value of the output fluctuation parameter X remains still large.

Therefore, a cylinder whose output fluctuation parameter X does not decline by a predetermined value or more when the fuel injection amount is forced to decrease by a predetermined amount can be specifically determined as not being an abnormal cylinder but being a normal cylinder.

Although not shown in the drawings, a situation opposite to the above-described situation, for example, the case where in the example shown in FIG. 16A, only the #1 cylinder is abnormal and its fuel injection amount is less by −40% (i.e., the imbalance rate is −40%), is assumed. Then, if the fuel injection amount is forced to increase separately for each cylinder, it can be specifically determined that a cylinder whose output fluctuation parameter X decreases by a predetermined value or more is an abnormal cylinder (in particular, a lean-deviation abnormality cylinder), and that a cylinder whose output fluctuation parameter X does not decrease by the predetermined value or more is a normal cylinder. Therefore, it can be specifically determined that lean deviation is present.

Thus, as the amount of change in the output fluctuation parameter X from before to after the fuel injection amount is forced to increase or decrease is detected separately for each cylinder, an abnormal cylinder can be specifically determined in a manner in which a cylinder whose amount of change from before to after the fuel injection amount is forced to change is greater than or equal to a predetermined value is an abnormal cylinder and a cylinder whose amount of change is less than the predetermined value is a normal cylinder, and at the same time, it can be specifically determined whether the deviation is rich deviation or lean deviation. In this case, the fuel injection amount changing control of forcing the fuel injection amount to increase or decrease separately for each cylinder is executed by a portion of the ECU 20, and that portion of the ECU 20 can be termed fuel injection amount changing control means. Furthermore, in this case, the specific determination or determining of a cylinder having such abnormality is performed by a portion of the ECU 20, and the portion can be contained in a portion of the ECU 20 that performs the function of the abnormality detection means, and can be termed the abnormal-cylinder determining portion.

Next, a second embodiment of the invention will be described. In comparison with the first embodiment, the second embodiment has a feature that if the variation abnormality in the air/fuel ratio among the cylinders is detected, it is assumed that one of the cylinders alone has a fuel injection amount deviation, and then the imbalance cylinder, that is, the abnormal cylinder, is specifically determined or determined, and the target value of the auxiliary air/fuel ratio feedback control is changed by taking into account particularly the influence of the exhaust gas from the cylinder on the post-catalyst sensor (or, the detected value provided by the sensor). This feature will be described below, and substantially the descriptions as those given above in conjunction with the first embodiment will be generally omitted. For example, an engine in accordance with the second embodiment has substantially the same construction as the internal combustion engine of the first embodiment, except that the engine of the second embodiment is an in-line three-cylinder internal combustion engine, and therefore in the following description, the same reference characters as those used above will be used below to denote the same portions and the like as those in the first embodiment, and further descriptions of such constructions in the second embodiment will be omitted below.

In the second embodiment, if the variation abnormality in the air/fuel ratio among the cylinders is present, an abnormal cylinder is tentatively or provisionally determined, and the changing of the second predetermined target value suitable to the abnormal cylinder is carried out. This will be described with reference to a flowchart shown in FIG. 17. It is to be noted that steps S1701, S1705 and S1707 in FIG. 17 correspond to steps S1401 to S1405 in FIG. 14, respectively.

If in step S1701 an affirmative determination that the variation abnormality in the air/fuel ratio among the cylinders is present is made, an abnormal cylinder is determined in step S1703. The determining of the abnormal cylinder is executed by the method described above with reference to FIGS. 16A to 16F. The description will be continued below on the assumption that only one of the cylinders has abnormality.

Figure 18:
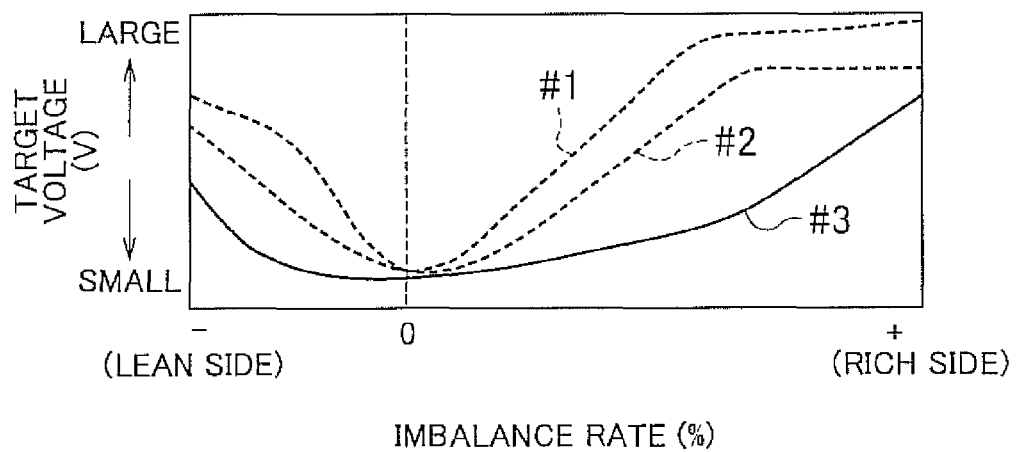
FIG. 18 is a graph showing a relation between the imbalance rate and the target voltage in the second embodiment of the invention.

After an abnormal cylinder is determined in step S1703, a target voltage of the auxiliary air/fuel ratio feedback control is calculated in step S1705. This calculation is executed by using data suitable to the cylinder determined in step S1703. FIG. 18 shows data regarding the #1 cylinder, data regarding the #2 cylinder and data regarding the #3 cylinder in a superimposed fashion. If it is assumed herein that the #1 cylinder is determined as being the abnormal cylinder in step S1703, the target voltage is found by searching the data regarding the #1 cylinder with reference to the imbalance rate calculated in step S1209. The data shown in FIG. 18 are determined beforehand so that the stronger the influence that the exhaust gas from the cylinder determined as the abnormal cylinder has on the post-catalyst sensor 18, the larger the amount of change of the target voltage of the auxiliary air/fuel ratio feedback control, that is, the second predetermined target value, from the stoichiometric ratio-corresponding value. Strong influence of the exhaust gas from the cylinder determined as being the abnormal cylinder on the post-catalyst sensor 18 means that the exhaust gas from the cylinder easily reaches the post-catalyst sensor 18 or easily impacts on the post-catalyst sensor 18. Concretely, the data show in FIG. 18 are based on a relation that the exhaust gas from the #1 cylinder more strongly affects the detected value provided by the post-catalyst sensor 18 than the exhaust gas from the #2 cylinder and the exhaust gas from the #3 cylinder, and the exhaust gas from the #2 cylinder more strongly affects the detected value provided by the post-catalyst sensor 18 than the exhaust gas from the #3 cylinder.

Then, in step S1707, the target value of the auxiliary air/fuel ratio feedback control which, during the initial state, is set at the stoichiometric ratio-corresponding sensor output Vrefr, which is the stoichiometric ratio-corresponding value, is changed to the target voltage calculated as described above. As a result, from this time on, the target voltage calculated in step S1403 is used as the target value of the auxiliary air/fuel ratio feedback control (that corresponds to a second predetermined target value in the invention), and the auxiliary air/fuel ratio feedback control is executed so that the detected value based on the output of the post-catalyst sensor 18 follows to be equal as the target value.

Thus, in the second embodiment, it is possible to perform a control that factors in the influence of the exhaust gas from the abnormal cylinder on the post-catalyst sensor 18 to a greater extent than in the first embodiment. Therefore, according to the second embodiment, the exhaust air/fuel ratio can be more appropriately controlled, and exhaust gases can be bettered.

A third embodiment of the invention will be described. In comparison with the first and second embodiments, the third embodiment has a feature that if the variation abnormality in the air/fuel ratio among the cylinders is detected, the target value of the auxiliary air/fuel ratio feedback control is changed in substantially the same manner as in the first and second embodiments and, furthermore, the target value is appropriately changed according to the operation state of the engine. Hereinafter, this feature will be described, and substantially the same descriptions as those given above in conjunction with the first embodiment will be generally omitted. The following description of the third embodiment will be made on assumption that the engine in accordance with the third embodiment has substantially all the elements of the engine in accordance with the second embodiment. However, the feature of the third embodiment (correction of the target value based on the operation state of the engine) may also be applied to the first embodiment.

Figure 17:
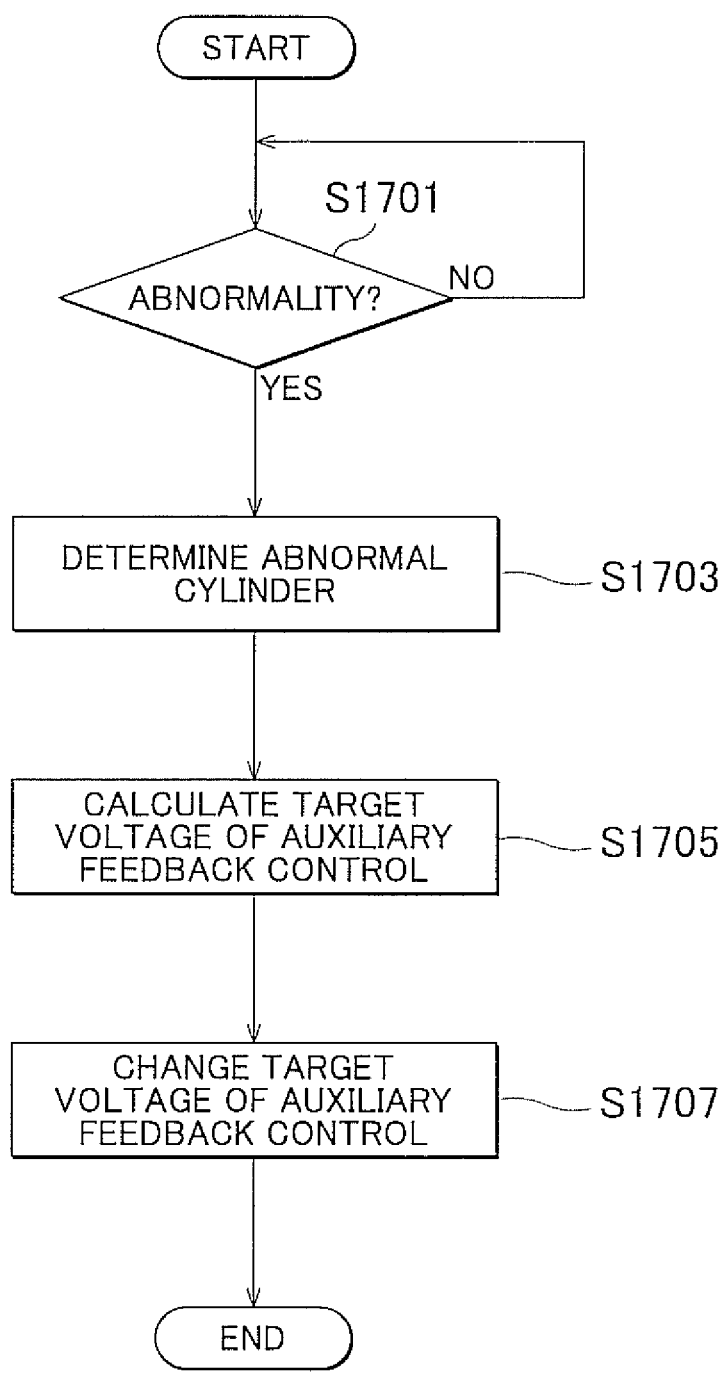
FIG. 17 is a flowchart of the target voltage changing routine in the auxiliary air/fuel ratio feedback control in a second embodiment of the invention.

In the third embodiment, too, the target value of the auxiliary air/fuel ratio feedback control is changed so that the target value is changed on the basis of what are illustrated in FIGS. 17 and 18. However, the target voltage calculated in step S1705 is a target voltage reference value.

Figure 19:
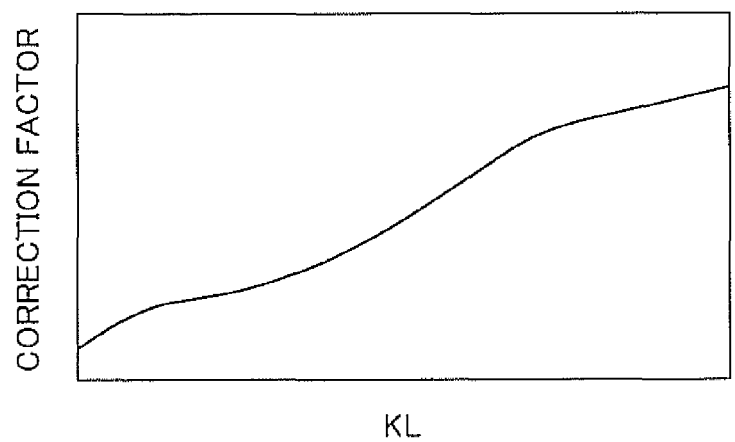
FIG. 19 is a graph showing a relation between the engine load and a correction factor in a third embodiment of the invention.

After the target value of the auxiliary air/fuel ratio feedback control is changed to a target voltage reference value, the thus-changed target value is appropriately corrected on the basis of the operation state of the engine, that is, the present region of operation. Concretely, the target value is appropriately corrected on the basis of the engine rotation speed Ne and the engine load KL. For example, data regarding the relation between the engine load KL and the correction factor as shown in FIG. 19 is searched appropriately with reference to the engine load so as to find a correction factor. Then, the thus-found correction factor is added to or multiplied with the target voltage reference value calculated in step S1705 to find a target voltage, to which the target voltage of the auxiliary air/fuel ratio feedback control is appropriately changed. Incidentally, the target voltage reference value may be corrected on the basis of either one of the engine rotation speed and the engine load.

The influence of exhaust gas on the post-catalyst sensor 18 changes according to the operation state of the engine since the flow rate of exhaust gas changes according to the operation state. Since the third embodiment changes the amount of change of the target value used in the auxiliary air/fuel ratio feedback control on the basis of the operation state as described above, the third embodiment makes it possible to perform a control that more factors in the influence of exhaust gas on the post-catalyst sensor 18, as compared with the second embodiment. Therefore, according to the third embodiment, the exhaust air/fuel ratio can be appropriately controlled, and exhaust gases can be bettered.

While the embodiments of the invention have been described in detail above, various other embodiments of the invention are conceivable. For example, in the foregoing three embodiments, the detection of the variation abnormality in the air/fuel ratio among the cylinders is performed only once during the period from when the engine starts to when the engine stops, and if the abnormality is present, the target value of the auxiliary air/fuel ratio feedback control is changed substantially only once (in the third embodiment, the target voltage reference value is changed only once during the period from when the engine starts to when the engine stops). However, the detection of the variation abnormality in the air/fuel ratio among the cylinders, the derivation of the imbalance rate and/or the determining of an abnormal cylinder may be performed as appropriate instead of, for example, only once during the period between the start and stop of the engine, and the changing of the target value of the auxiliary air/fuel ratio feedback control may also be performed as appropriate. Furthermore, although in the foregoing embodiments, the imbalance rate is used as a value, that is, a parameter, that represents the degree of variation in air/fuel ratio among the cylinders, other values may also be used. It is appropriate that such a value is, for example, a value that indicates how large is the deviation of the fuel injection amount of a cylinder that has a fuel injection amount deviation from the fuel injection amount of a cylinder that does not have a fuel injection amount deviation on assumption that only one of the cylinders has fuel injection amount deviation. The aforementioned numerical values are merely illustrative, and can be changed to other values.

The embodiments of the invention are not limited to the foregoing embodiments. On the contrary, the invention includes all modifications, applications, equivalents that are encompassed by the idea of the invention defined by the appended claims. Therefore, the invention should not be interpreted in a limited manner, but can also be applied to other arbitrary technologies that belong to the range of the idea of the invention.

What is claimed is:

1. A control apparatus for an internal combustion engine comprising:
   a first air/fuel ratio detection device provided in a portion of an exhaust passageway of an internal combustion engine that has a plurality of cylinders, the portion being on an upstream side of an exhaust gas-controlling catalyst arranged in the exhaust passageway;
   a second air/fuel ratio detection device provided in a portion of the exhaust passageway on a downstream side of the exhaust gas-controlling catalyst;
   an air/fuel ratio feedback control device that executes an air/fuel ratio feedback control so that a first detected value based on output of the first air/fuel ratio detection device follows a first predetermined target value and so that a second detected value based on output of the second air/fuel ratio detection device follows a second predetermined target value that corresponds to the first predetermined target value during an initial state;
   an abnormality detection device configured to detect a variation abnormality in air/fuel ratio among the cylinders; and
   a change device that changes the second predetermined target value of the air/fuel ratio feedback control when the variation abnormality in the air/fuel ratio among the cylinders is detected by the abnormality detection device.

2. The control apparatus for an internal combustion engine according to claim 1, wherein:
   the abnormality detection device is configured to find degree of variation in air/fuel ratio among the cylinders as well as to detect the variation abnormality in the air/fuel ratio among the cylinders; and
   the change device changes the second predetermined target value according to the degree found by the abnormality detection device.

3. The control apparatus for an internal combustion engine according to claim 2, wherein:
   the abnormality detection device is configured to find a value that indicates how much an amount of a fuel injection of a cylinder that has an fuel injection amount deviation is deviated from an amount of fuel injection of a cylinder that does not have the fuel injection amount deviation on assumption that only one of the cylinders has the fuel injection amount deviation, if the variation abnormality is present, as well as to detect the variation abnormality in the air/fuel ratio among the cylinders; and
   the change device changes the second predetermined target value according to the value found by the abnormality detection device.

4. The control apparatus for an internal combustion engine according to claim 3, wherein:
   the abnormality detection device is configured to determine which one of the cylinders has the fuel injection amount deviation on assumption that only one of the cylinders has the fuel injection amount deviation, if the variation abnormality is present, as well as to detect the variation abnormality in the air/fuel ratio among the cylinders, derive the degree and derive the value; and
   the change device changes the second predetermined target value according to the value found by the abnormality detection device and the cylinder determined by the abnormality detection device.

5. The control apparatus for an internal combustion engine according to claim 4, wherein the change device changes the second predetermined target value such that an amount of the change of the second predetermined target value is increased with increase in influence of exhaust gas from the cylinder determined by the abnormality detection device on the second detected value of the second air/fuel ratio detection device.

6. The control apparatus for an internal combustion engine according to claim 2, wherein the change device changes the second predetermined target value based on at least one of rotation speed of the engine and load of the engine.

7. The control apparatus for an internal combustion engine according to claim 1, wherein:
   the first air/fuel ratio detection device includes a wide-range air/fuel ratio sensor; and
   the second air/fuel ratio detection device includes an $O_2$ sensor.

* * * * *